United States Patent
Jannard et al.

(10) Patent No.: US 10,582,168 B2
(45) Date of Patent: *Mar. 3, 2020

(54) GREEN IMAGE DATA PROCESSING

(71) Applicant: RED.COM, LLC, Irvine, CA (US)

(72) Inventors: James H. Jannard, Las Vegas, NV (US); Thomas Graeme Nattress, Acton (CA); Richard Greene, Austin, TX (US); Uday Mathur, Los Angeles, CA (US)

(73) Assignee: RED.COM, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,849

(22) Filed: Jun. 26, 2018

(65) Prior Publication Data

US 2019/0124302 A1    Apr. 25, 2019

Related U.S. Application Data

(63) Continuation of application No. 15/656,958, filed on Jul. 21, 2017, now abandoned, which is a
(Continued)

(51) Int. Cl.
*H04N 9/04* (2006.01)
*H04N 9/64* (2006.01)
(Continued)

(52) U.S. Cl.
CPC ............ *H04N 9/04* (2013.01); *H04N 5/2254* (2013.01); *H04N 5/23229* (2013.01);
(Continued)

(58) Field of Classification Search
CPC ............... G06T 3/4015; G06T 5/002; G06T 2207/10024; G06T 3/4038; G06T 2200/32;
(Continued)

(56) References Cited

U.S. PATENT DOCUMENTS 3,154,493 A    10/1964    Pierrot et al.
3,971,065 A    7/1976     Bayer
(Continued)

FOREIGN PATENT DOCUMENTS

CA    2 831 698    10/2008
CA    2 683 636    1/2014
(Continued)

OTHER PUBLICATIONS

US 9,392,240 B2, 07/2016, Jannard et al. (withdrawn)
(Continued)

*Primary Examiner* — Chiawei Chen
(74) *Attorney, Agent, or Firm* — Knobbe Martens Olson & Bear LLP

(57) ABSTRACT

Embodiments provide a video camera that can be configured to highly compress video data in a visually lossless manner. The camera can be configured to transform blue, red, and/or green image data in a manner that enhances the compressibility of the data. The camera can be configured to transform at least a portion of the green image data in a manner that enhances the compressibility of the data. The data can then be compressed and stored in this form. This allows a user to reconstruct the red, blue, and/or green image data to obtain the original raw data or a modified version of the original raw data that is visually lossless when demosaiced. Additionally, the data can be processed in a manner in which at least some of the green image elements are demosaiced first and then the red, blue, and/or some green elements are reconstructed based on values of the demosaiced green image elements.

22 Claims, 23 Drawing Sheets

Related U.S. Application Data continuation of application No. 15/173,232, filed on Jun. 3, 2016, now Pat. No. 9,716,866, which is a continuation of application No. 14/180,168, filed on Feb. 13, 2014, now Pat. No. 9,521,384.

(60) Provisional application No. 61/778,325, filed on Mar. 12, 2013, provisional application No. 61/764,821, filed on Feb. 14, 2013.

(51) Int. Cl.
*H04N 5/232* (2006.01)
*H04N 19/426* (2014.01)
*H04N 19/44* (2014.01)
*H04N 5/225* (2006.01)

(52) U.S. Cl.
CPC .............. *H04N 9/045* (2013.01); *H04N 9/64* (2013.01); *H04N 19/426* (2014.11); *H04N 19/44* (2014.11)

(58) Field of Classification Search
CPC .. G06T 2207/20208; G09G 2300/0452; H04N 19/426; H04N 19/44; H04N 5/2254; H04N 5/23229; H04N 9/04; H04N 9/045; H04N 9/64
See application file for complete search history.

(56) References Cited

U.S. PATENT DOCUMENTS

| | | |
|---|---|---|
| 3,972,010 A | 7/1976 | Dolby |
| 4,200,889 A | 4/1980 | Strobele |
| 4,316,213 A | 2/1982 | Wharton et al. |
| 4,450,487 A | 5/1984 | Koide |
| 4,561,012 A | 12/1985 | Acampora |
| 5,016,107 A | 5/1991 | Sasson et al. |
| 5,040,063 A | 8/1991 | Citta et al. |
| 5,049,983 A | 9/1991 | Matsumoto et al. |
| 5,132,803 A | 7/1992 | Suga et al. |
| 5,172,227 A | 12/1992 | Tsai et al. |
| 5,249,053 A | 9/1993 | Jain |
| 5,255,083 A | 10/1993 | Capitant et al. |
| 5,303,062 A | 4/1994 | Kawarai |
| 5,343,243 A | 8/1994 | Maeda |
| 5,412,427 A | 5/1995 | Rabbani et al. |
| 5,442,718 A | 8/1995 | Kobayashi et al. |
| 5,526,047 A | 6/1996 | Sawanobori |
| 5,535,246 A | 7/1996 | Beech |
| 5,537,157 A | 7/1996 | Washino et al. |
| 5,563,655 A | 10/1996 | Lathrop |
| 5,592,224 A | 1/1997 | Shim |
| 5,592,237 A | 1/1997 | Greenway |
| 5,600,373 A | 2/1997 | Chui et al. |
| 5,818,524 A | 10/1998 | Juen |
| 5,875,122 A | 2/1999 | Acharya |
| 5,949,468 A | 9/1999 | Asahina et al. |
| 5,991,515 A | 11/1999 | Fall et al. |
| 5,999,220 A | 12/1999 | Washino |
| 6,009,201 A | 12/1999 | Acharya |
| 6,091,851 A | 7/2000 | Acharya |
| 6,124,811 A | 9/2000 | Acharya et al. |
| 6,154,493 A | 11/2000 | Acharya et al. |
| 6,169,317 B1 | 1/2001 | Sawada et al. |
| 6,192,086 B1 | 2/2001 | Darr |
| 6,198,505 B1 | 3/2001 | Turner et al. |
| 6,262,763 B1 | 7/2001 | Totsuka |
| 6,269,217 B1 | 7/2001 | Rodriguez |
| RE37,342 E | 8/2001 | Washino et al. |
| 6,275,263 B1 | 8/2001 | Hu |
| 6,285,794 B1 | 9/2001 | Georgiev et al. |
| 6,314,206 B1 | 11/2001 | Sato |
| 6,466,699 B1 | 10/2002 | Schwartz et al. |
| RE38,079 E | 4/2003 | Washino et al. |
| 6,567,988 B1 | 5/2003 | Okawa |
| 6,597,860 B2 | 7/2003 | Song et al. |
| 6,697,106 B1 | 2/2004 | Saito |
| 6,778,709 B1 | 8/2004 | Taubman |
| 6,798,901 B1 | 9/2004 | Acharya et al. |
| 6,825,876 B1 | 11/2004 | Easwar et al. |
| 6,859,226 B2 | 2/2005 | Kawamura et al. |
| 6,867,717 B1 | 3/2005 | Ion |
| 6,878,977 B1 | 4/2005 | Kozuka et al. |
| 6,937,276 B2 | 8/2005 | Chung |
| 6,944,349 B1 | 9/2005 | Onno et al. |
| 6,958,774 B2 | 10/2005 | Kuroiwa |
| 6,983,074 B1 | 1/2006 | Clauson et al. |
| 6,989,773 B2 | 1/2006 | Wee et al. |
| 6,990,240 B2 | 1/2006 | Hagiwara |
| 6,995,793 B1 | 2/2006 | Albadawi et al. |
| 6,995,794 B2 | 2/2006 | Hsu et al. |
| 7,038,719 B2 | 5/2006 | Hirai |
| 7,039,254 B1 | 5/2006 | Maenaka et al. |
| 7,050,642 B2 | 5/2006 | Graffagnino |
| 7,092,016 B2 | 8/2006 | Morton et al. |
| 7,095,899 B2 | 8/2006 | Malvar |
| 7,110,605 B2 | 9/2006 | Marcellin et al. |
| 7,113,645 B2 | 9/2006 | Sano et al. |
| 7,126,634 B2 | 10/2006 | Kato |
| 7,127,116 B2 | 10/2006 | Goldstein et al. |
| 7,155,066 B2 | 12/2006 | Baharav |
| 7,174,045 B2 | 2/2007 | Yokonuma |
| 7,212,313 B1 | 5/2007 | Hoel |
| 7,253,836 B1 | 8/2007 | Suzuki et al. |
| 7,312,821 B2 | 12/2007 | Voss |
| 7,313,286 B2 | 12/2007 | Schwartz et al. |
| 7,324,141 B2 | 1/2008 | Kubo et al. |
| 7,343,043 B2 | 3/2008 | Yokonuma |
| 7,349,574 B1 | 3/2008 | Sodini et al. |
| 7,349,579 B2 | 3/2008 | Kadowaki et al. |
| 7,365,658 B2 | 4/2008 | Todorov et al. |
| 7,369,161 B2 | 5/2008 | Easwar et al. |
| 7,376,183 B2 | 5/2008 | Weigand et al. |
| 7,385,647 B2 | 6/2008 | Park |
| 7,388,992 B2 | 6/2008 | Atsumi et al. |
| 7,394,485 B2 | 7/2008 | Kim |
| 7,477,781 B1 | 1/2009 | Tanbakuchi |
| 7,480,417 B2 | 1/2009 | Malvar |
| 7,483,909 B2 | 1/2009 | Sena et al. |
| 7,512,283 B2 | 3/2009 | Brower |
| 7,526,134 B2 | 4/2009 | Matsubara |
| 7,577,689 B1 | 8/2009 | Masinter et al. |
| 7,590,301 B2 | 9/2009 | Wu |
| 7,609,300 B2 | 10/2009 | Wu |
| 7,656,561 B2 | 2/2010 | Mølgaard et al. |
| 7,778,473 B2 | 8/2010 | Kodama |
| 7,796,186 B2 | 9/2010 | Oshima |
| 7,830,967 B1 | 11/2010 | Jannard et al. |
| 7,868,879 B2 | 1/2011 | Rizko |
| 7,898,575 B2 | 3/2011 | Ishii |
| 7,902,512 B1 | 3/2011 | Chang et al. |
| 7,907,791 B2 | 3/2011 | Kinrot |
| 7,936,919 B2 | 5/2011 | Kameyama |
| 7,952,636 B2 | 5/2011 | Ikeda et al. |
| 8,014,597 B1 | 9/2011 | Newman |
| 8,125,547 B2 | 2/2012 | Oda et al. |
| 8,170,402 B2 | 5/2012 | Frost-Ruebling et al. |
| 8,174,560 B2 | 5/2012 | Jannard et al. |
| 8,237,830 B2 | 8/2012 | Jannard et al. |
| 8,358,357 B2 | 1/2013 | Jannard et al. |
| 8,477,173 B2 | 7/2013 | Kenoyer |
| 8,792,029 B2 | 7/2014 | Lee |
| 8,817,141 B2 | 8/2014 | Tanaka |
| 8,849,090 B2 | 9/2014 | Kosakai et al. |
| 8,872,933 B2 | 10/2014 | Jannard et al. |
| 8,878,952 B2 | 11/2014 | Jannard et al. |
| 9,019,393 B2 | 4/2015 | Jannard et al. |
| 9,025,929 B2 | 5/2015 | Kosakai et al. |
| 9,230,299 B2 | 1/2016 | Jannard et al. |
| 9,245,314 B2 | 1/2016 | Jannard et al. |
| 9,436,976 B2 | 9/2016 | Jannard et al. |
| 9,521,384 B2 | 12/2016 | Jannard et al. |
| 9,565,419 B2 | 2/2017 | Presler |

(56) References Cited

U.S. PATENT DOCUMENTS

| | | |
|---|---|---|
| 9,596,385 B2 | 3/2017 | Jannard et al. |
| 9,716,866 B2 | 7/2017 | Jannard et al. |
| 9,787,878 B2 | 10/2017 | Jannard et al. |
| 9,792,672 B2 | 10/2017 | Jannard et al. |
| 2001/0048477 A1 | 12/2001 | Misawa |
| 2002/0012055 A1 | 1/2002 | Koshiba et al. |
| 2002/0033737 A1 | 3/2002 | Staszewski et al. |
| 2002/0039142 A1 | 4/2002 | Zhang et al. |
| 2002/0041707 A1 | 4/2002 | Newman |
| 2002/0063787 A1 | 5/2002 | Watanabe |
| 2002/0167602 A1 | 11/2002 | Nguyen |
| 2002/0196354 A1 | 12/2002 | Chang et al. |
| 2003/0005140 A1 | 1/2003 | Dekel et al. |
| 2003/0007567 A1 | 1/2003 | Newman et al. |
| 2003/0011747 A1 | 1/2003 | Lenz |
| 2003/0018750 A1 | 1/2003 | Onno et al. |
| 2003/0031322 A1 | 2/2003 | Beckmann et al. |
| 2003/0038885 A1 | 2/2003 | Rodriguez |
| 2003/0053684 A1 | 3/2003 | Acharya |
| 2003/0122037 A1 | 7/2003 | Hyde et al. |
| 2003/0122937 A1 | 7/2003 | Guarnera et al. |
| 2003/0135302 A1 | 7/2003 | Hung et al. |
| 2003/0156188 A1 | 8/2003 | Abrams, Jr. |
| 2003/0185302 A1 | 10/2003 | Abrams, Jr. |
| 2003/0202106 A1 | 10/2003 | Kanleinsberger et al. |
| 2004/0032516 A1 | 2/2004 | Kakarala |
| 2004/0051793 A1 | 3/2004 | Tecu |
| 2004/0095477 A1 | 5/2004 | Maki et al. |
| 2004/0131274 A1 | 7/2004 | Perlmutter et al. |
| 2004/0165080 A1 | 8/2004 | Burks et al. |
| 2004/0169746 A1 | 9/2004 | Chen et al. |
| 2004/0169751 A1 | 9/2004 | Takemura et al. |
| 2004/0196389 A1 | 10/2004 | Honda |
| 2004/0201701 A1 | 10/2004 | Takagi |
| 2004/0201760 A1 | 10/2004 | Ota et al. |
| 2004/0213472 A1 | 10/2004 | Kodama et al. |
| 2004/0218812 A1 | 11/2004 | Douglass |
| 2004/0246346 A1 | 12/2004 | Kim et al. |
| 2005/0041116 A1 | 2/2005 | Tsukioka |
| 2005/0182972 A1 | 8/2005 | Apostolopoulos et al. |
| 2005/0183118 A1 | 8/2005 | Wee et al. |
| 2005/0213812 A1 | 9/2005 | Ishikawa et al. |
| 2005/0264661 A1 | 12/2005 | Kawanishi et al. |
| 2005/0276496 A1 | 12/2005 | Molgaard et al. |
| 2005/0286797 A1 | 12/2005 | Hayaishi |
| 2006/0007324 A1 | 1/2006 | Takei |
| 2006/0012694 A1 | 1/2006 | Yoneda et al. |
| 2006/0061659 A1 | 3/2006 | Niwa |
| 2006/0061822 A1 | 3/2006 | Sung et al. |
| 2006/0114987 A1 | 6/2006 | Roman |
| 2006/0158704 A1 | 7/2006 | Kameyama |
| 2006/0165178 A1 | 7/2006 | Ma et al. |
| 2006/0165179 A1 | 7/2006 | Feuer et al. |
| 2006/0170786 A1 | 8/2006 | Won |
| 2006/0177139 A1 | 8/2006 | Marcellin et al. |
| 2006/0210156 A1 | 9/2006 | Lei et al. |
| 2006/0221199 A1 | 10/2006 | Nakajima |
| 2006/0221203 A1 | 10/2006 | Abe et al. |
| 2006/0221230 A1 | 10/2006 | Dutt et al. |
| 2006/0232690 A1 | 10/2006 | Tamura et al. |
| 2006/0244842 A1 | 11/2006 | Hatano |
| 2006/0257129 A1* | 11/2006 | Shibatani ............ G02B 27/646 396/55 |
| 2007/0035636 A1 | 2/2007 | Wu |
| 2007/0041634 A1 | 2/2007 | Sugimori |
| 2007/0051817 A1 | 3/2007 | Yano |
| 2007/0065139 A1 | 3/2007 | Ishii |
| 2007/0085916 A1 | 4/2007 | Nishio |
| 2007/0091187 A1 | 4/2007 | Lin |
| 2007/0092149 A1 | 4/2007 | Sung |
| 2007/0109316 A1 | 5/2007 | Fainstain |
| 2007/0127095 A1 | 6/2007 | Sugimori |
| 2007/0133902 A1 | 6/2007 | Kumar |
| 2007/0133967 A1* | 6/2007 | Takahashi ............ G02B 27/646 396/55 |
| 2007/0153093 A1 | 7/2007 | Lin et al. |
| 2007/0160142 A1 | 7/2007 | Abrams, Jr. |
| 2007/0164335 A1 | 7/2007 | McKee |
| 2007/0165116 A1 | 7/2007 | Hung et al. |
| 2007/0206852 A1 | 9/2007 | McGee |
| 2007/0216782 A1 | 9/2007 | Chernoff |
| 2007/0285517 A1 | 12/2007 | Ishikuro |
| 2008/0002035 A1 | 1/2008 | Yoshida |
| 2008/0012953 A1 | 1/2008 | Yang et al. |
| 2008/0018746 A1 | 1/2008 | Kawanami |
| 2008/0055426 A1 | 3/2008 | Pertsel et al. |
| 2008/0062272 A1 | 3/2008 | Kuroiwa |
| 2008/0063070 A1 | 3/2008 | Schwartz et al. |
| 2008/0063269 A1 | 3/2008 | Chiu |
| 2008/0079818 A1 | 4/2008 | Takahashi |
| 2008/0084581 A1 | 4/2008 | Kobayashi et al. |
| 2008/0089406 A1 | 4/2008 | Fukuhara et al. |
| 2008/0131013 A1 | 6/2008 | Suino et al. |
| 2008/0240583 A1 | 10/2008 | Jones |
| 2008/0259180 A1 | 10/2008 | Ovsiannikov |
| 2008/0273809 A1 | 11/2008 | Demos |
| 2008/0284485 A1 | 11/2008 | Schilling |
| 2008/0285871 A1 | 11/2008 | Ishikawa |
| 2008/0301315 A1 | 12/2008 | Cheng et al. |
| 2009/0033752 A1 | 2/2009 | Bodnar et al. |
| 2009/0052797 A1 | 2/2009 | Matsushita et al. |
| 2009/0052861 A1 | 2/2009 | Goldman |
| 2009/0080784 A1 | 3/2009 | Luh et al. |
| 2009/0086817 A1 | 4/2009 | Matsuoka et al. |
| 2009/0141140 A1 | 6/2009 | Robinson |
| 2010/0014590 A1 | 1/2010 | Smith |
| 2010/0026849 A1 | 2/2010 | Hamada |
| 2010/0111489 A1 | 5/2010 | Presler |
| 2010/0134902 A1* | 6/2010 | Naitou ............ G02B 7/102 359/696 |
| 2010/0142811 A1 | 6/2010 | Okamoto et al. |
| 2010/0225795 A1 | 9/2010 | Suzuki et al. |
| 2011/0149110 A1 | 6/2011 | Sugiyama |
| 2011/0170794 A1 | 7/2011 | Ogawa et al. |
| 2011/0194763 A1 | 8/2011 | Moon et al. |
| 2012/0105960 A1* | 5/2012 | Park ............ G02B 27/646 359/554 |
| 2012/0229926 A1* | 9/2012 | Wade ............ G02B 7/08 359/824 |
| 2013/0016427 A1* | 1/2013 | Sugawara ............ G02B 7/08 359/557 |
| 2013/0027790 A1* | 1/2013 | Park ............ 359/824 |
| 2013/0162849 A1* | 6/2013 | Wu ............ H04N 5/225 348/208.4 |
| 2013/0170039 A1* | 7/2013 | Miyoshi ............ G02B 27/646 359/554 |
| 2013/0177301 A1* | 7/2013 | Nakayama ............ G02B 27/646 396/55 |
| 2013/0201559 A1* | 8/2013 | Minamisawa ............ G02B 7/08 359/557 |
| 2013/0258172 A1* | 10/2013 | Seol ............ H04N 5/232 348/357 |
| 2014/0063297 A1 | 3/2014 | Yamura |
| 2014/0161367 A1 | 6/2014 | Ridenour et al. |
| 2014/0218580 A1 | 8/2014 | Mayer et al. |
| 2014/0226036 A1 | 8/2014 | Jannard et al. |
| 2014/0333810 A1 | 11/2014 | Nakaseko |
| 2015/0092094 A1 | 4/2015 | Itonaga et al. |
| 2015/0229843 A1* | 8/2015 | Shimizu ............ G03B 5/00 348/222.1 |
| 2016/0316106 A1 | 10/2016 | Jannard et al. |
| 2017/0034400 A1 | 2/2017 | Jannard et al. |
| 2017/0053385 A1 | 2/2017 | Jannard et al. |
| 2018/0070061 A1 | 3/2018 | Jannard et al. |
| 2018/0124290 A1 | 5/2018 | Jannard et al. |
| 2018/0130183 A1 | 5/2018 | Jannard et al. |

FOREIGN PATENT DOCUMENTS

| | | |
|---|---|---|
| CN | 1941842 | 4/2007 |
| CN | 101689357 | 3/2015 |
| CN | 104702926 | 6/2015 |
| EP | 1 028 595 | 8/2000 |

(56) References Cited

FOREIGN PATENT DOCUMENTS

| | | |
|---|---|---|
| EP | 1 605 403 | 12/2005 |
| EP | 2 145 330 | 1/2010 |
| EP | 2 419 879 | 8/2016 |
| HK | 1141893 | 8/2015 |
| JP | 06-054239 | 2/1994 |
| JP | 2000-069488 | 3/2000 |
| JP | 2001-515318 | 9/2001 |
| JP | 2002-051266 | 2/2002 |
| JP | 2004-038693 | 2/2004 |
| JP | 2004-248061 | 9/2004 |
| JP | 2004-260821 | 9/2004 |
| JP | 2004-282780 | 10/2004 |
| JP | 2004-349842 | 12/2004 |
| JP | 2005-210216 | 8/2005 |
| JP | 2005-286415 | 10/2005 |
| JP | 2006-171524 | 6/2006 |
| JP | 2006-311314 | 11/2006 |
| JP | 2007-267072 | 10/2007 |
| JP | 2008-124976 | 5/2008 |
| JP | 2011-015347 | 1/2011 |
| JP | 2012-523790 | 10/2012 |
| KR | 10-2002-0041778 | 6/2002 |
| KR | 10-2009-0035204 | 4/2009 |
| KR | 10-1478380 | 12/2014 |
| TW | 490590 | 6/2002 |
| TW | I527435 | 3/2016 |
| WO | WO 91/001613 | 2/1991 |
| WO | WO 92/010911 | 6/1992 |
| WO | WO 97/009818 | 3/1997 |
| WO | WO 99/012345 | 3/1999 |
| WO | WO 99/013429 | 3/1999 |
| WO | WO 99/060793 | 11/1999 |
| WO | WO 2008/128112 | 10/2008 |
| WO | WO 2009/087783 | 7/2009 |
| WO | WO 2014/127153 | 8/2014 |

OTHER PUBLICATIONS

Answers & Objections to Plaintiff Bruce Royce's First Set of Interrogatories, *Jinni Tech, Ltd., and Bruce Royce v. Red.Com, Inc., Red.Com, LLC, and Landmine Media, Inc.*, Case No. 2-17-cv-00217-JLR, filed Feb. 15, 2018, in 20 pages.
Declaration of Cliff Reader, PhD. under 37 C.F.R. § 1.68, Inter Partes Review of U.S. Pat. No. 9,230,299, Ex. 1003, *Apple Inc., v. Red.Com, LLC*, dated May 6, 2019, in 100 pages.
Declaration of Cliff Reader, PhD. under 37 C.F.R. § 1.68, Inter Partes Review of U.S. Pat. No. 9,245,314, Ex. 1003, *Apple Inc., v. Red.Com, LLC*, dated May 6, 2019, in 103 pages.
Defendant Jinni Tech. Ltd.'s Jan. 15, 2019 Supplemental Response to Red.Com LLC's Interrogatories No. 11 and No. 12. *Red.Com, LLC. v. Jinni Tech, Ltd., and Bruce Royce*, Case No. 8:17-cv-02082-CJC-KES, filed Jan. 16, 2019, in 15 pages.
Defendant Jinni Tech. Ltd.'s Response to Red.Com Llc's Second Set of Interrogatories, *Red.Com, LLC. v. Jinni Tech, Ltd., and Bruce Royce*, Case No. 8:17-cv-02082-CJC-KES, filed Nov. 2, 2018, in 14 pages.
Defendant's Answer to First Amended Complaint, *Red.Com, Inc., v. Jinni Tech, Ltd., and Bruce Royce*, Case No. 8:17-cv-00382, filed Oct. 25, 2017, in 24 pages.
Defendants Amended Answer to Complaint, *Red.Com, LLC. V. Jinni Tech, Ltd., and Bruce Royce*, Case No. 8:17-cv-02082-CJC-KES, filed Mar. 28, 2018, in 14 pages.
Exhibit 1010, *Apple Inc., v. Red.Com, LLC*, U.S. Appl. No. 60/911,196 as filed (including Filing Receipt and Notice to File Missing Parts) Apr. 11, 2007, pp. 31.
Exhibit 1011, *Apple Inc., v. Red.Com, LLC*, U.S. Appl. No. 61/017,406 as filed (including Filing Receipt, Notice to File Missing Parts and Missing Parts Response) filed Dec. 28, 2007, pp. 68.
Exhibit 1012, *Apple Inc., v. Red.Com, LLC*, U.S. Appl. No. 60/923,339 as filed (including Filing Receipt) Apr. 13, 2007, pp. 22.
First Set of Interrogatories to Defendant Jinni Tech, Ltd., *Red.Com, Inc., v. Jinni Tech, Ltd., and Bruce Royce*, Case No. 8:17-cv-00382, dated Feb. 15, 2018 in 9 pages.
Long, Ben, "Real World Aperture", 2007, Chapter 3 & Chapter 6, pp. 47. [Uploaded in 2 parts].
Order Granting Plaintiff's Motion for Voluntary Dismissal Without Prejudice [Dkt. 94], *Red.Com, Inc., v. Jinni Tech, Ltd., and Bruce Royce*, Case No. 8:17-cv-00382, filed Jun. 27, 2019 in 3 pages.
Patent Owner Red.Com, LLC's Preliminary Response to Petition for Inter Partes Review of U.S. Pat. No. 9,230,299, *Apple Inc., v. Red.Com, LLC*, filed Aug. 15, 2019, in 228 pages.
Patent Owner Red.Com, LLC's Preliminary Response to Petition for Inter Partes Review of U.S. Pat. No. 9,245,314, *Apple Inc., v. Red.Com, LLC*, filed Aug. 15, 2019, in 260 pages.
Petition for Inter Partes Review of U.S. Pat. No. 9,230,299, *Apple Inc., v. Red.Com, LLC*, dated May 6, 2019, in 79 pages.
Petition for Inter Partes Review of U.S. Pat. No. 9,245,314, *Apple Inc., v. Red.Com, LLC*, dated May 6, 2019, in 80 pages.
Plaintiff's Answers and Objections to First Set of Interrogatories (Nos. 1-9), *Red.Com, Inc., v. Jinni Tech, Ltd., and Bruce Royce*, Case No. 8:17-cv-00382, filed Dec. 7, 2018 in 49 pages. [Uploaded in 3 parts].
Request for Admissions to Jinni Tech, Ltd., Amended, *Red.Com, Inc., v. Jinni Tech, Ltd., and Bruce Royce*, Case No. 8:17-cv-00382, dated Feb. 25, 2018 in 25 pages.
Roberts et al., "Television Colorimetry: A Tutorial for System Designers", Research and Development Department, Technical Resources, The British Broadcasting Corporation, Sep. 1995, pp. 19.
Roberts, A., "The Film Look: Its Not Just Jerky Motion . . . ", R&D White Paper, WHP 053, Research and Development, British Broadcasting Corporation, Dec. 2002, pp. 19.
Search Report in Brazilian Application No. PI0809662-7, dated Jan. 21, 2019.
Serial ATA International Organization: Serial ATA Revision 2.6, Feb. 15, 2007, pp. 600.
Summons to attend oral proceedings in European Application No. 14177071.9, dated Apr. 9, 2019.
Zhang et al., "Lossless Compression of Color Mosaic Images", IEEE Transactions on Image Processing, vol. 15, No. 6, Jun. 2006, pp. 1379-1388.
Official Communication in Japanese Application No. 2015-558135, dated Apr. 2, 2019.
U.S. Pat. No. 8,174,560, Video Camera, May 8, 2012.
U.S. Pat. No. 8,872,933, Video Camera, Oct. 28, 2014.
U.S. Pat. No. 8,358,357, Video Camera, Jan. 22, 2013.
U.S. Pat. No. 9,230,299, Video Camera, Jan. 5, 2016.
U.S. Pat. No. 9,245,314, Video Camera, Jan. 26, 2016.
U.S. Pat. No. 9,787,878, Video Camera, Oct. 10, 2017.
U.S. Pat. No. 9,596,385, Electronic Apparatus, Mar. 14, 2017.
U.S. Pat. No. 8,237,830, Video Camera, Aug. 7, 2012.
U.S. Pat. No. 7,830,967, Video Camera, Nov. 9, 2010.
U.S. Pat. No. 8,878,952, Video Camera, Nov. 4, 2014.
U.S. Pat. No. 9,019,393, Video Processing System and Method, Apr. 28, 2015.
U.S. Pat. No. 9,436,976, Video Camera, Sep. 6, 2016.
U.S. Pat. No. 9,792,672, Video Capture Devices and Methods, Oct. 17, 2017.
U.S. Pat. No. 8,174,560, Video Camera, May 16, 2014.
U.S. Pat. No. 9,521,384 Green Average Subtraction in Image Data, Dec. 13, 2016.
U.S. Pat. No. 9,716,866, Green Image Data Processing, Jul. 25, 2017.
U.S. Appl. No. 16/008,340, Video Camera, filed Jun. 14, 2018.
U.S. Appl. No. 16/100,049, Video Capture Devices and Methods, filed Aug. 9, 2018.
U.S. Appl. No. 16/264,338, Video Capture Devices and Methods, Jan. 31, 2019.
U.S. Appl. No. 15/702,550, filed Sep. 12, 2017 (and entire prosecution history), Jannard et al.
U.S. Appl. No. 16/008,340, filed Jun. 14, 2018 (and entire prosecution history), Jannard et al.

(56) References Cited

OTHER PUBLICATIONS

U.S. Appl. No. 16/100,049, filed Aug. 9, 2018 (and entire prosecution history), Jannard et al.
U.S. Appl. No. 16/264,338, filed Jan. 31, 2019 (and entire prosecution history), Jannard et al.
2K Digital Cinema Camera Streamlines Movie and HD Production, Silicon Imaging Digital Cinema, Press News Releases, Hollywood, California, date listed Nov. 1, 2006, in 2 pages. www.siliconimaging.com_DigitalCinema_News_PR_11_01_06_1.
4:4:4 12-bit Uncompressed DVX100, date listed May 11-16, 2004, in 9 pages. http://www.dvinfo.net/forum/archive/index.php/t-20332-p-13.html.
Abel Cine, "Abel North American Agent for Phantom Cameras," date listed Feb. 7, 2007, http://web.archive.org/web/20120523003248/http://about.abelcine.com/2007/02/07/abel-north-american-agent-for-phantom-cameras/ in 2 pages.
Arriflex D-20 Preliminary Specifications, archive.org indicates available on-line on May 31, 2005, www.arri.com, [online], http://web.archive.org/web/20050531010626/www.arri.com/entry/products.htm, pp. 1-2.
Arriflex D-21: The Film Style Digital Camera, date listed Jan. 4, 2008, www.arri.de, [online] http://www.arri.de/press/press/press_release.html?tx_ttnews[tt_news]=32&tx_ttnews[backPid]=1781&cHash=e89c9b0855e89c9b0855.
Bazhyna et al., "Near-lossless compression algorithm for Bayer pattern color filter arrays" SPIE—The International Society for Optical Engineering, vol. 5678; Copyright date listed is 2005.
Bruner, Guy, Silicon Imaging Shows 1920×1080P Camera System, Camcorder News, Las Vegas, NAB, date listed Apr. 25, 2006, in 8 pages. http://www.camcorderinfo.com/content/Silicon-Imaging-Shows-1920x1080P-Camera-System.htm.
CineForm Insider, blog post dated Nov. 13, 2007; http://cineform.blogspot.com/2007/11/cineform-on-chip.html, in 3 pages.
CineForm Insider, date listed as Jan. through Dec. 2006, in 17 pages. http://cineform.blogspot.com/search?updated-min=2006-01-01T00:00:00-08:00&updated-max=2007-01-01T00:00:00-08:00&max-results=22.
CineForm Online Workflow Solutions for Film and Video, date listed Nov. 1, 2006.
CineForm Raw—Dalsa and Vision Research Raw File Converters, printed Aug. 16, 2010, www.cineform.com, [online].
CineForm RAW—Technology Overview and Workflow, date listed Apr. 13, 2006, in 3 pages.
CinemaTechnic Camera Profiles | ARRI 16SR, date listed 2001. http://cinematechnic.com/resources/arri_16SR.html, date retrieved Feb. 12, 2010.
Dalsa Origin Brochure, document indicates that it was printed Apr. 2004, in 2 pages.
"Dalsa Technology with Vision," Presentation, date listed Mar. 2003, pp. 35.
Digital Cinema Initiatives, LLC, "Digital Cinema System Specification", date listed Jul. 20, 2005, V1.0, pp. 176.
Digital Negative (DNG) Specification, Adobe Systems Incorporated, Feb. 2005, in 50 pages.
Digital Negative (DNG) Specification, date listed Apr. 2008.
Doutre et al., "An Efficient Compression Scheme for Colour Filter Array Images Using Estimated Colour Difference", IEEE Canadian Conference on Electrical and Computer Engineering, Apr. 22-26, 2007, pp. 24-27.
"Gamma Correction and Tone Reproduction of Scan Image", date listed Jun. 1994, in 35 pages.
Gastaldi et al., "Compression of Videos Captured Via Bayer Patterned Color Filter Arrays", Signal Processing Conference, 2005 13th European, Sep. 2005, in 4 pages.
Ion, Lucian, et al., High Dynamic Range Data Centric Workflow System, DALSA Digital Cinema, this paper reported to be originally presented at SMPTE Technical Conference and Exhibit, New York, date listed Nov. 2005, in 14 pages.
Ion, Lucian, et al., White Paper: 4K Digital Capture and Postproduction Workflow, DALSA Digital Cinema, in 5 pages.
ISO Standard 15444 (part 1): Information technology—JPEG 2000 image coding system: Core coding system, pp. i-v, xiv, 1-11,120-122, copyright date listed is 2004.
JPEG 2000 still image coding versus other standards, date listed Jul. 2000.
Lee et al., "A Novel Approach of Image Compression in Digital Cameras with a Bayer Color Filter Array", IEEE 2001, date listed 2001, pp. 482-485.
LEICA Instructions, LEICA R8, in 70 pages.
Leica R system: The analog-digital system, date listed 2005, in 40 pages.
Lian et al., "Reversing Demosaicking and Compression in Color Filter Array Image Processing: Performance Analysis and Modeling", IEEE Transactions on Image Processing, vol. 15, No. 11; date listed is Nov. 2006.
Lukac et al., "Single-Sensor Camera Image Processing", Color Image Processing: Methods and Applications, Chapter 16, pp. 363-392, date listed on document is "CRC Press 2006".
Lukac et al.: Single-sensor camera image compression, date listed May 2006, pp. 299-307.
Lukac et al., "Single-Sensor Image Compression From the End-User's Perspective", IEEE CCECE/CCGEI, May 2006, in 4 pages.
Marino et al., "Wavelet-Based Perceptually Lossless Coding of R-G-B images", Integrated Computer-Aided Engineering, date listed 2000, vol. 7, pp. 117-134.
Menon et al., "On the Dependency Between Compression and Demosaicing in Digital Cinema", Visual Media Production, The 2nd IEEE European Conference, Nov. 30-Dec. 1, 2005, pp. 104-111.
Mitani, et al.; A 4 K×2 K-pixel color image pickup system; IEICE Transactions on Information and Systems; E82D (8): 1219-1227; Aug. 1999.
Mitani, et al.; Ultrahigh-definition color video camera system with 4K-scanning lines; Sensors and Camera Systems for Scientific, Industrial, and Digital Photography Applications IV, 5017: 159-166, Published May 16, 2013.
NAB2006DayThree, archive.org indicates available on-line Mar. 2, 2007, [on-line] http://web.archive.org/web/20070302002153/http://web.mac.com/mikedcurtis/iWeb/HD4NDs_Image_Galleries/NAB2006DayThreePt1.html, in 5 pages.
New Camcorder from Silicon Imaging, © 2006-2008 Digital Camcorder News, date listed Apr. 19, 2006, in 2 pages. http://www.digitalcamcordernews.com/2006/04/new-camcorder-from-silicon-imaging.
Nordhauser, Steve, Silicon Imaging Announces World's First Digital Cinema Camera with Direct-to-Disk 10-bit CineForm RAW™ Recording and Adobe® Production Studio Integration, Silicon Imaging, Inc., Albany, New York, date listed Jun. 26, 2006, in 3 pages. http://www.filmmakers.com/news/digital/article_713.shtml.
Notes from the field: Silicon Imaging SI-1920HDVR camera in actual use, FRESHDV, date listed May 18, 2006, in 2 pages. http://www.freshdv.com/2006/05/notes-from-field-silicon-imaging-si.html.
Olsen et al., "An improved image processing chain for mobile terminals", Graduate Thesis, Agder University College, date listed May 2002, in 71 pages.
On-line discussion thread from www.dvxuser.com, first post in thread dated May 1, 2006, retrieved from http://www.dvxuser.com/V6/showthread.php?55590-Worried-about-depending-on-RED-codec.
On-line discussion thread from www.dvxuser.com, first post in thread dated Sep. 8, 2006, retrieved from http://www.dvxuser.com/V6/showthread.php?70333-Workflow-(good)-News.
On-line discussion thread from www.dvxuser.com, first post in thread dated Sep. 8, 2006, retrieved from http://www.dvxuser.com/V6/showthread.php?70412-First-video-from-the-RED-4K-demo.
On-line discussion thread from www.dvxuser.com, first post in thread dated Sep. 8, 2006, retrieved from http://www.dvxuser.com/V6/showthread.php?70417-RED-workflow-(how-we-prepared-the-Red-Footage-for-IBC.
On-line discussion thread from www.dvxuser.com, first post in thread dated Sep. 10, 2006, retrieved from http://www.dvxuser.com/V6/showthread.php?70671-4K-RAW-data-rates.

(56) References Cited

OTHER PUBLICATIONS

On-line discussion thread from www.dvxuser.com, first post in thread dated Sep. 18, 2006, retrieved from http://www.dvxuser.com/V6/showthread.php?71703-Dynamic-Range.
On-line discussion thread from www.dvxuser.com, first post in thread dated Sep. 19, 2006, retrieved from http://www.dvxuser.com/V6/showthread.php?71756-RED-code-RAW-lossless-lossy.
On-line discussion thread from www.dvxuser.com, first post in thread dated Sep. 24, 2006, retrieved from http://www.dvxuser.com/V6/showthread.php?72306-4k-live-(-4k-Still-from-Red-One-is-up-.
On-line discussion thread from www.dvxuser.com, first post in thread dated Oct. 2, 2006, retrieved from http://www.dvxuser.com/V6/showthread.php?73415-1st-video-posted.
On-line discussion thread from www.dvxuser.com, first post in thread dated Oct. 3, 2006, retrieved from http://www.dvxuser.com/V6/showthread.php?73448-editing-4K-at-home.
On-line discussion thread from www.dvxuser.com, first post in thread dated Oct. 9, 2006, retrieved from http://www.dvxuser.com/V6/showthread.php?74232-1k-Bubble-Girl-video-up.
On-line discussion thread from www.dvxuser.com, first post in thread dated Oct. 31, 2006, retrieved from http://www.dvxuser.com/V6/showthread.php?76711-First-REDCODE-image!
On-line discussion thread from www.dvxuser.com, first post in thread dated Nov. 3, 2006, retrieved from http://www.dvxuser.com/V6/showthread.php?76954-Red-still-gallery-updated-with-new-4k-still!
On-line discussion thread from www.dvxuser.com, first post in thread dated Nov. 4, 2006, retrieved from http://www.dvxuser.com/V6/showthread.php?77032-RAW-vs-REDCODE-RAW.
On-line discussion thread from www.dvxuser.com, first post in thread dated Nov. 5, 2006, retrieved from http://www.dvxuser.com/V6/showthread.php?77117-Slo-Mo-and-REDCODE-RAW-questions.
On-line discussion thread from www.dvxuser.com, first post in thread dated Nov. 6, 2006, retrieved from http://www.dvxuser.com/V6/showthread.php?77216-120fps-at-4K.
On-line discussion thread from www.dvxuser.com, first post in thread dated Nov. 13, 2006, retrieved from http://www.dvxuser.com/V6/showthread.php?78010-David-Stump-on-Red.
On-line discussion thread from www.dvxuser.com, first post in thread dated Nov. 14, 2006, retrieved from http://www.dvxuser.com/V6/showthread.php?78150-RED-L-A-photos-what-have-you-s.
On-line discussion thread from www.dvxuser.com, first post in thread dated Nov. 15, 2006, retrieved from http://www.dvxuser.com/V6/showthread.php?78290-Red-Camera-first-test-with-Still-Lens-(-Nikon-).
On-line discussion thread from www.dvxuser.com, first post in thread dated Nov. 19, 2006, retrieved from http://www.dvxuser.com/V6/showthread.php?78623-Red-compression-and-matrix-tests.
On-line discussion thread from www.dvxuser.com, first post in thread dated Nov. 20, 2006, retrieved from http://www.dvxuser.com/V6/showthread.php?78823-Image-links-fixed.
On-line discussion thread from www.dvxuser.com, first post in thread dated Nov. 21, 2006, retrieved from http://www.dvxuser.com/V6/showthread.php?78934-redcode-amazingly-good-!
On-line discussion thread from www.dvxuser.com, first post in thread dated Nov. 24, 2006, retrieved from http://www.dvxuser.com/V6/showthread.php?79130-More-footage.
On-line discussion thread from www.dvxuser.com, first post in thread dated Dec. 11, 2006, retrieved from http://www.dvxuser.com/V6/showthread.php?80963-NEW-VIDEO!!!-Bus-Video-1080p-clip-online-REDCODE.
On-line discussion thread from www.dvxuser.com, first post in thread dated Dec. 18, 2006, retrieved from http://www.dvxuser.com/V6/showthread.php?81686-Specs-changes.
On-line discussion thread from www.hdforindies.com, first post in thread dated Sep. 8, 2006, retrieved from http://www.hdforindies.com/2006/09/amsterdam-ibc-2006-red-news-redcode-4k.html.
On-line discussion thread from www.hdforindies.com, first post in thread dated Dec. 19, 2006, retrieved from http://www.hdforindies.com/2006/12/mikes-conjecture-on-redcode-data-rates.html.
Parrein et al., "Demosaicking and JPEG2000 Compression of Microscopy Images", 2004 International Conference on Image Processing (ICIP), date listed 2004, pp. 521-524.
Phantom 65 the world's first 65mm digital cinema, date listed Nov. 22, 2006.
Phantom 65, Vision Research, Inc., date listed Sep. 27, 2006, in 2 pages.
Phantom 65, archive.org indicates available on-line Feb. 4, 2007, www.visionresearch.com, [online], http://web.archive.org/web/20070204110551/www.visionresearch.com/index.cfm?sector=htm/files&page=camera_65_new, pp. 1-2.
Phantom® Digital Widescreen CinemaTM, Vision Research, date listed May 3, 2006, in 17 pages.
"Phantom HD", http://www.alfavisionsrl.com.ar/espanol/alquiler/camera/info/manuals/DS_phantomHD.pdf, dated Mar. 30, 2007, pp. 2.
Poynton, Charles, "A Technical Introduction to Digital Video," 1996, Ch. 6 (Gamma), pp. 91-114.
Puhovski, Nenad, [compiled by] High Definition Report from Cilect Standing Committee for New Technologies, Madrid, date listed 2006, in 146 pages.
"RED Digital Cinema", http://www.dvxuser.com/articles/redteam/RED-DVXUSER.pdf, copyright date Dec. 31, 2006, pp. 2.
Red Digital Cinema, Brochure, date listed 2006, in 2 pages.
Red Digital Cinema, "Introducing REDCODE", Sep. 2006, International Broadcasting Convention, Amsterdam, the Netherlands, in 1 page.
Red Digital Cinema, "Mysterium Sensor", Sep. 2006, International Broadcasting Convention, Amsterdam, the Netherlands, in 1 page.
Red Digital Cinema, "Preliminary Specifications", Sep. 2006, International Broadcasting Convention, Amsterdam, the Netherlands, in 1 page.
Red Digital Cinema, "Preliminary Specifications", Apr. 14-19, 2007, Las Vegas, Nevada, in 1 page.
Red Digital Cinema, "Simple. 4K to Anything", Sep. 2006, International Broadcasting Convention, Amsterdam, the Netherlands, in 1 page.
"Red Exclusive Brochure", www.dvxuser.com, retrieved on Feb. 5, 2013, in 1 page http://www.dvxuser.com/V6/archive/index.php/t-54786.html.
Red vs Dalsa Origin, Reduser.net, The DSMC System, Red One, date listed Oct. 26, 2007, in 5 pages. http://www.reduser.net/forum/archive/index.php/t-5344.html.
Robin, Gamma Correction, www.broadcastengineering.com [online], date listed Jan. 1, 2005 in 5 pages.
SI-2K Digital Cinema Camera, Silicon Imaging, copyright date listed is 2007, in 14 pages. http://web.archive/org/web/20080610162715/www.siliconimaging.com Date retrieved Sep. 3, 2015.
Silicon Imaging SI-2K Mini Full Specifications, archive.org indicates available on-line May 23, 2007, www.siliconimaging.com, [online], http://web.archive.org/web/20070523223217/www.siliconimaging.com/DigitalCinema/SI_2K_full_specifications.html, pp. 1-2.
Silicon Imaging, PRESS News Releases, www.siliconimaging.com/DigitalCinema/SI_Press.html, printed Nov. 5, 2012.
Silicon Imaging Support: Frequently-Asked-Questions, archive.org indicates available on-line Dec. 12, 2007, www.siliconimaging.com, [online], http://web.archive.org/web/20071212165310/www.siliconimaging.com/DigitalCinema/SiliconImaging_faq.html, in 12 pages.
SI-1920HDVR Camera Architecture, Silicon Imaging Digital Cinema, https://web.archive.org/web/20060423023557/http://www.siliconimaging.com/DigitalCinema/CameraArchitecture.html, archive.org indicates available on-line Apr. 23, 2006, in 2 pages.
SI-1920HDVR Cineform Raw workflow, Silicon Imaging Digital Cinema, https://web.archive.org/web/20060423023730/http://www.siliconimaging.com/DigitalCinema/CineformWorkflow.html, archive.org indicates available on-line Apr. 23, 2006, in 2 pages.

(56) References Cited

OTHER PUBLICATIONS

SI-1920HDVR, Silicon Imaging Digital Cinema, http://web.archive.org/web/20060828080100/http://www.siliconimaging.com/DigitalCinema.html, archive.org indicates available on-line Aug. 28, 2006, in 2 pages.
SI-1920HDVR FAQ, Silicon Imaging Digital Cinema, http://web.archive.org/web/20060423023601/http://www.siliconimaging.com/DigitalCinema/faq.html, archive.org indicates available on-line Apr. 23, 2006, in 5 pages.
SI-1920HDVR Key Features, Silicon Imaging Digital Cinema, in 2 pages. http://www.siliconimaging.com/DigitalCinema/key_features.html, Date retrieved Sep. 3, 2010.
SI-1920HDVR Key Features, Silicon Imaging Digital Cinema, https://web.archive.org/web/20060423023637/http://www.siliconimaging.com/DigitalCinema/key_features.html, archive.org indicates available on Apr. 23, 2006, in 2 pages.
SI-1920HDVR Specifications, Silicon Imaging Digital Cinema, http://web.archive.org/web/20060423023724/http://www.siliconimaging.com/DigitalCinema/full_specifications.html, archive.org indicates available on-line Apr. 23, 2006, in 2 pages.
Smith, et al.; Constant quality JPEG2000 rate control for digital cinema; Source: Proceedings of SPIE—The International Society for Optical Engineering, v 6508, n PART 1, 2007, Conference: Visual Communications and Image Processing 2007, Jan. 30, 2007-Feb. 1, 2007.
Smith, et al., Image Resolution of the One-CCD Palomar Motion Picture Camera, 37th Advance Motion Imaging Conference, Seattle, Washington, date listed Feb. 27-Mar. 1, 2003, in 8 pages.
Some Like It Raw, Silicon Imaging D-Cinema Camera with Cineform RAW Codec, Studio Daily, date listed May 8, 2006, [on-line] http://www.studiodaily.com/2006/05/some-like-it-raw/.
Taubman et al., "JPEG2000: Standard for Interactive Imaging", Proceedings of the IEEE, vol. 90, No. 8, Aug. 2002, in 22 pages.
The Red One Camera 4K Resolution, various dates listed, starting from Feb. 7, 2007, URL:http://www.vnnforum.com/showthread.php?t=44489 [retrieved on Aug. 3, 2012].
Vision Research introduces the Phantom HD, http://web.archive.org/web/20060715130053/www.visionresearch.com/phantomhd.html, archive.org indicates available on-line Jul. 15, 2006, in 3 pages.
Wilt, Adam, Camera Log, NAB 2009—SI-2K, date listed Apr. 19, 2009, in 5 pages. http://provideocoalition.com/index.php/awilt/story/nab_2009_si_2k/.
Wu et al., "Temporal Color Video Demosaicking via Motion Estimation and Data Fusion", IEEE Transactions on Circuits and Systems for Video Technology, vol. 16, No. 2, Feb. 2006, pp. 231-240.
Xie et al., "A Low-Complexity and High-Quality Image Compression Method for Digital Cameras", ETRI Journal, vol. 28, No. 2, Apr. 2006, pp. 260-263.
Zeng, Jianfen, et al., Video Coding Techniques for Digital Cinema, © Jul. 2004 IEEE International Conference on Multimedia and Expo (ICME), pp. 415-418, vol. 1.
Zhang et al., "Real-Time Lossless Compression of Mosaic Video Sequences", Aug. 10, 2005, pp. 8.
Complaint for Patent Infringement in Ex Parte Reexam Application No. 90/012550, dated Feb. 12, 2013.
Complaint for Patent Infringement; *Red.Com, Inc., Inc. v. Sony Corporation of America and Sony Electronics, Inc.*, U.S. District Court for the Southern District of California, Case No. 3:13 cv-00334-DMS-BGS, dated Feb. 12, 2013.
Complaint for Patent Infringement; *Red.Com, Inc. v. Nokia USA Inc. and Nokia Technologies, Ltd.*, Case No. 8:16-cv-00594-MWF-JC, filed Mar. 30, 2016 in 9 pages.
Joint Motion for Dismissal Without Prejudice; *Red.Com, Inc. v. Sony Corporation of America and Sony Electronics Inc.*, Case No. 13CV0334-DMS-BGS, dated Jul. 19, 2013.
Order Granting Joint Motion for Dismissal Without Prejudice; *Red.Com, Inc. v. Sony Corporation of America and Sony Electronics Inc.*, Case No. 13CV0334-DMS-BGS, dated Jul. 19, 2013.
Defendants' Answer and Affirmative Defenses, *Red.Com, Inc. v. Nokia USA Inc. and Nokia Technologies, Ltd.*, Case No. 8:16-cv-00594-MWF-JC, filed Aug. 1, 2016 in 18 pages.
Complaint for Patent Infringement, *Red.Com, Inc. v. Sony Corp. of Am. and Sony Electronics Inc.*, Case No. 2:16-cv-00937, filed Aug. 24, 2016, in 32 pages.
Answer to Plaintiff's Complaint for Patent Infringement, *Red.Com, Inc. v. Sony Corp. of Am. and Sony Electronics Inc.*, Case No. 2:16-cv-00937, filed Nov. 21, 2016, in 16 pages.
Disclosure of Asserted Claims and Infringement Contentions, *Red.Com, Inc. v. Nokia USA Inc. and Nokia Technologies, Ltd.*, Case No. 8:16-cv-00594-MWF-JC, served Oct. 27, 2016, in 226 pages.
Disclosure of Initial Invalidity Contentions with Exhibits, *Red.Com, Inc. v. Nokia USA Inc. and Nokia Technologies, Ltd.*, Case No. 8:16-cv-00594-MWF-JC, served Dec. 9, 2016, in 2500 pages.
Order of Dismissal, Sony Corp. of America, *Red.Com, Inc. v. Sony Corp. of Am. and Sony Electronics Inc.*, Case No. 2:16-cv-00937, filed Dec. 27, 2016, in 1 page.
Order for Dismissal, *Red.Com, Inc. v. Nokia USA, Inc.*, Case No. 8:16-cv-00594, filed Jan. 27, 2017, in 2 pages.
Complaint for Patent Infringement, *Red.Com, Inc. v. Jinni Tech, Ltd., and Bruce Royce*, Case No. 8:17-cv-00382, filed Mar. 2, 2017, in 41 pages.
First Amended Complaint, *Jinni Tech, Ltd., and Bruce Royce v. Red.Com, Inc., Red.Com, LLC., and Landmine Media, Inc.*, Case No. 2-17-cv-00217-JLR, filed May 23, 2017, in 32 pages.
First Amended Complaint, *Red.Com, LLC v. Jinni Tech, Ltd., and Bruce Royce*, Case No. 8:17-cv-00382, filed Jul. 24, 2017, in 45 pages.
Decision from Oral Proceedings in Opposition to EP 2145330, dated May 23, 2017, in 3 pages.
Answer and Affirmative Defenses to First Amended Complaint, *Jinni Tech, Ltd., and Bruce Royce v. Red.Com, Inc., Red.Com, LLC, and Landmine Media, Inc.*, Case No. 2-17-cv-00217-JLR, filed Nov. 13, 2017, in 17 pages.
Comments submitted before Oral Proceedings, R. 116EPC in regards to European Publication No. EP2145330, dated Feb. 23, 2017.
Defendant's Answer, Affirmative Defenses and Counterclaims; Demand for Jury Trial; *Red.Com, Inc. v. Sony Corporation of America and Sony Electronics Inc.*, Case No. 13CV0334-DMS-BGS, dated Jun. 20, 2013.
European Opposition Opponent Comments submitted before Oral Proceedings in Opposition to EP 2145330, dated Feb. 2, 2017, in 7 pages.
European Opposition Minutes from Oral Proceedings in Opposition to EP 2145330, dated May 23, 2017, in 14 pages.
European Opposition Summary of Facts and Submissions in Opposition to EP 2145330, dated May 23, 2017, in 32 pages.
Re-Examination of U.S. Pat. No. 8,174,560 and its complete file history.
Request for Re-Examination of U.S. Pat. No. 8,174,560, dated Sep. 13, 2012.
Re-Examination Grant in U.S. Pat. No. 8,174,560, dated Dec. 6, 2012.
Official Communication in European Application No. 10726688.4, dated Jul. 14, 2014.
Summons to Attend Oral Proceedings in European Application No. 10726688.4, dated May 13, 2015.
Official Communication in Japanese Application No. 2012-506053, dated Oct. 16, 2013.
International Search Report and Written Opinion in PCT Application No. PCT/US2010/028808, dated Aug. 3, 2010.
Examination Report in Australian Application No. 2008240144, dated Dec. 23, 2010.
Examination Report in Australian Application No. 2012216606, dated Jul. 31, 2014.
Notice of Acceptance in Australian Application No. 2012216606, dated Apr. 28, 2016.
Examination Report in Australian Application No. 2016213747, dated Jul. 27, 2017.
Official Communication in Chinese Application No. 200880018570.6, dated Mar. 31, 2014.

(56) References Cited

OTHER PUBLICATIONS

Official Communication in Chinese Application No. 201510041027.X.
Official Communication in European Application No. 08745686.9, dated Mar. 30, 2010.
Extended European Search Report in European Application No. 08745686.9, dated Aug. 4, 2011.
Office Action in European Application No. 08745686.9, dated Aug. 10, 2012.
Summons to Attend Oral Proceedings in European Application No. 08745686.9, dated Oct. 31, 2013.
Official Communication in European Application No. 08745686.9, dated Feb. 5, 2014.
Official Communication in European Application No. 08745686.9, dated Mar. 18, 2014.
Notice of Opposition in European Application No. 08745686.9, dated Apr. 22, 2015.
Official Communication in European Application No. 14177071.9, dated Aug. 22, 2014.
Official Communication in European Application No. 14177071.9, dated Jul. 30, 2015.
Communication Pursuant to article 94(3) EPC dated May 2, 2016.
European Opposition Opponent Reply Brief in Opposition to EP 2145330, dated Feb. 18, 2016 in 15 pages.
European Opposition Preliminary Opinion of the Opposition Division in EP Application No. 08745686.9, dated Jun. 17, 2016 in 16 pages.
Official Communication in Indian Application No. 6379/DELNP/2009, dated Jul. 25, 2017.
Official Communication in Japanese Application No. 2010-503253, dated Jun. 26, 2012.
Office Action in Korean Application No. 10-2009-7023045, dated Feb. 6, 2014.
Official Communication in Korean Application No. 10-2014-7021892.
Office Action in Mexican Application No. MX/a/2009/010926, dated May 16, 2012.
Examination Report in New Zealand Application No. 580171, dated Feb. 22, 2011.
Examination Report in New Zealand Application No. 601474, dated Aug. 1, 2012.
Examination Report in New Zealand Application No. 620333, dated Feb. 14, 2014.
Examination Report in New Zealand Application No. 710813, dated Aug. 12, 2015.
Further Examination Report in New Zealand Application No. 710813, dated Aug. 3, 2017.
Examination Report in New Zealand Application No. 728945, dated Aug. 3, 2017.
Official Communication in Taiwanese Application No. 099111497, dated Jul. 24, 2015.
Written Opinion in PCT Application No. PCT/US2008/060126, dated Jul. 7, 2008.
International Preliminary Report on Patentability in PCT Application No. PCT/US2008/060126, dated Oct. 13, 2009.
Official Communication in Taiwanese Application No. 097113289, dated Aug. 29, 2013.
Official Communication in Taiwanese Application No. 097113289, dated Jul. 15, 2014.
Final Office Action in Re-Examination of U.S. Pat. No. 8,174,560, dated Oct. 31, 2013.
Notice of Intent to Issue Ex Parte Reexamination Certificate in Re-Examination of U.S. Pat. No. 8,174,560, dated Mar. 5, 2014.
International Search Report and Written Opinion in PCT Application No. PCT/US2010/060851, dated Aug. 24, 2011.
International Search Report and Written Opinion in PCT Application No. PCT/US2014/016301, dated May 21, 2014.
International Preliminary Report on Patentability and Written Opinion in PCT Application No. PCT/US2014/016301, dated Aug. 27, 2015.
Canon, Digital Video Camcorder Instruction Manual: XL2, Canon Inc., 2004, in 122 pages.
Chandler et al., "Visually Lossless Compression of Digitized Radiographs Based on Contrast Sensitivity and Visual Masking", Proceedings of SPIE, vol. 5749, 2005, in 14 pages.
"Color Filter Array", Wikipedia, http://en.wikipedia.org/wiki/Color_filter_array, printed Aug. 18, 2017 in 4 pages.
"Color Filter Array Designs", as archived by www.archive.org on Nov. 13, 2006, http://www.quadibloc.com/other/cfaint.htm, 15 pages.
Fox, David, "HD Wins Variable Acceptance Across Europe", http://www.urbanfox.tv/articles/cameras/c11ibc2001cameras.htm, 2001, in 7 pages.
"Handbook of Image and Video Processing", Second Edition, Elsevier Academic Press, 2005, pp. 644, 657, 739-740.
Panasonic®, "Operating Instructions: Camera-Recorder", Model No. AG-DVX100Bp, 2005, in 88 pages.
Panasonic®, "Operating Instructions: Camera-Recorder", Model No. AJ-HDC27Hp, DVCPRO HD, 2005, in 140 pages.
Panasonic®, "VariCam DVCPRO HD", Model No. AJ-HDC27H Variable Frame-Rate HD Camera-Recorder, 2004, in 20 pages.
Panavision®, "Genesis User's Manual", Version 1.4, http://panalab.panavision.com/sites/default/files/docs/documentLibrary/Genesis%20Users%20Manual.pdf, 2008, in 278 pages.
Sci-Tech Awards, http://www.oscars.org/sci-tech, printed Oct. 2, 2017 in 11 pages.
Silverstein et al., "The Relationship Between Image Fidelity and Image Quality", as printed Sep. 7, 2004 in 5 pages.
Slone et al., "Assessment of Visually Lossless Irreversible Image Compression: Comparison of Three Methods by Using an Image-Comparison Workstation", Radiology, May 2000, vol. 215, No. 2, pp. 543-553.
Sony®, "Digital Camcorder", Operating Instructions, Model No. DSR-PD150, 2000, in 172 pages.
Sony®, "HD Camcorder: HDW-F900", Operation Manual, 1st Edition (Revised 1), Aug. 13, 2000, in 253 pages.
Sony®, "HD Color Camera: HDC1500 Series", Operation Manual, 1st Edition (Revised 8), May 13, 2008, in 65 pages.
"Term: Compression, Visually Lossless", http://www.digitizationguidelines.gov/term.php?term=compressionvisuallylossless, as printed Jan. 23, 2018 in 1 page.
"Viper FilmStream Camera System", Product Data Sheet, a Thompson Brand, Grass Valley, 2003, in 4 pages.
Wang et al., "New Color Filter Arrays of High Light Sensitivity and High Demosaicking Performance", Powerpoint Presentation, http://www.eecs.qmul.ac.uk/~phao/Papers/ICIP11.ppt.pdf, IEEE International Conference on Image Processing (ICIP), Brussels, Belgium, Sep. 11-14, 2011, in 21 pages.
Zhu et al., "Color Filter Arrays Based on Mutually Exclusive Blue Noise Patterns", Journal of Visual Communication and Image Representation, vol. 10, 1999, pp. 245-267.
Declaration of Thomas Graeme Nattress dated Oct. 1, 2017 in 4 pages.
Appendix A, "Example Image of a Red One Camera", Obtained from http://www.red.com/products/red-one#tech-specs, Jun. 27, 2013 in 3 pages.
Appendix B, "Example Image of a Red Epic Camera", Obtained from http://www.red.com/products/epic-mx#tech-specs, Jun. 27, 2013 in 3 pages.
Appendix C, "Example Image of a Scarlet Camera", Obtained from http://www.red.com/products/scarlet#scarlet-dragon, Jun. 27, 2013 in 3 pages.
Appendix D, Claim Chart, created Jun. 27, 2013 in 34 pages.
Grounds of Appeal as filed in European Patent Application No. 08745686.9, dated Oct. 2, 2017 in 42 pages.
Official Communication in Japanese Application No. 2015-558135, dated May 1, 2018.
Complaint for Patent Infringement, *Red.Com, LLC.* v. *Jinni Tech, Ltd., and Bruce Royce*, Case No. 8:17-cv-02082, filed Nov. 29, 2017, in 44 pages.
Defendants' Answer and Affirmative Defenses to Complaint, *Red.Com, LLC.* v. *Jinni Tech, Ltd., and Bruce Royce*, Case No. 8:17-cv-02082-CJC-KES, filed Mar. 7, 2018, in 12 pages.

(56) References Cited

OTHER PUBLICATIONS

Order Grating Stipulation to Consolidate and Discharging Order to Show Cause, *Red.Com, LLC.* v. *Jinni Tech, Ltd., and Bruce Royce*, Case No. 8:17-cv-02082-CJC-KES, filed Jul. 2, 2018, in 1 page.

* cited by examiner

| | n-3 | n-2 | n-1 | n | n+1 | n+2 | n+3 | n+4 |
|---|---|---|---|---|---|---|---|---|
| m+4 | $G_{m+4,n-3}$ | $R_{m+4,n-2}$ | $G_{m+4,n-1}$ | $R_{m+4,n}$ | $G_{m+4,n+1}$ | $R_{m+4,n+2}$ | $G_{m+4,n+3}$ | $R_{m+4,n+4}$ |
| m+3 | $B_{m+3,n-3}$ | $G_{m+3,n-2}$ | $B_{m+3,n-1}$ | $G_{m+3,n}$ | $B_{m+3,n+1}$ | $G_{m+3,n+2}$ | $B_{m+3,n+3}$ | $G_{m+3,n+4}$ |
| m+2 | $G_{m+2,n-3}$ | $R_{m+2,n-2}$ | $G_{m+2,n-1}$ | $R_{m+2,n}$ | $G_{m+2,n+1}$ | $R_{m+2,n+2}$ | $G_{m+2,n+3}$ | $R_{m+2,n+4}$ |
| m+1 | $B_{m+1,n-3}$ | $G_{m+1,n-2}$ | $B_{m+1,n-1}$ | $G_{m+1,n}$ | $B_{m+1,n+1}$ | $G_{m+1,n+2}$ | $B_{m+1,n+3}$ | $G_{m+1,n+4}$ |
| m | $G_{m,n-3}$ | $R_{m,n-2}$ | $G_{m,n-1}$ | $R_{m,n}$ | $G_{m,n+1}$ | $R_{m,n+2}$ | $G_{m,n+3}$ | $R_{m,n+4}$ |
| m-1 | $B_{m-1,n-3}$ | $G_{m-1,n-2}$ | $B_{m-1,n-1}$ | $G_{m-1,n}$ | $B_{m-1,n+1}$ | $G_{m-1,n+2}$ | $B_{m-1,n+3}$ | $G_{m-1,n+4}$ |
| m-2 | $G_{m-2,n-3}$ | $R_{m-2,n-2}$ | $G_{m-2,n-1}$ | $R_{m-2,n}$ | $G_{m-2,n+1}$ | $R_{m-2,n+2}$ | $G_{m-2,n+3}$ | $R_{m-2,n+4}$ |
| m-3 | $B_{m-3,n-3}$ | $G_{m-3,n-2}$ | $B_{m-3,n-1}$ | $G_{m-3,n}$ | $B_{m-3,n+1}$ | $G_{m-3,n+2}$ | $B_{m-3,n+3}$ | $G_{m-3,n+4}$ |

*FIG. 3*

|  | $n-3$ | $n-2$ | $n-1$ | $n$ | $n+1$ | $n+2$ | $n+3$ | $n+4$ |
|---|---|---|---|---|---|---|---|---|
| $m+4$ | $G_{m+4,n-3}$ |  | $G_{m+4,n-1}$ |  | $G_{m+4,n+1}$ |  | $G_{m+4,n+3}$ |  |
| $m+3$ |  | $G_{m+3,n-2}$ |  | $G_{m+3,n}$ |  | $G_{m+3,n+2}$ |  | $G_{m+3,n+4}$ |
| $m+2$ | $G_{m+2,n-3}$ |  | $G_{m+2,n-1}$ |  | $G_{m+2,n+1}$ |  | $G_{m+2,n+3}$ |  |
| $m+1$ |  | $G_{m+1,n-2}$ |  | $G_{m+1,n}$ |  | $G_{m+1,n+2}$ |  | $G_{m+1,n+4}$ |
| $m$ | $G_{m,n-3}$ |  | $G_{m,n-1}$ |  | $G_{m,n+1}$ |  | $G_{m,n+3}$ |  |
| $m-1$ |  | $G_{m-1,n-2}$ |  | $G_{m-1,n}$ |  | $G_{m-1,n+2}$ |  | $G_{m-1,n+4}$ |
| $m-2$ | $G_{m-2,n-3}$ |  | $G_{m-2,n-1}$ |  | $G_{m-2,n+1}$ |  | $G_{m-2,n+3}$ |  |
| $m-3$ |  | $G_{m-3,n-2}$ |  | $G_{m-3,n}$ |  | $G_{m-3,n+2}$ |  | $G_{m-3,n+4}$ |

*FIG. 5*

|  | n-3 | n-2 | n-1 | n | n+1 | n+2 | n+3 | n+4 |
|---|---|---|---|---|---|---|---|---|
| m+4 |  |  |  |  |  |  |  |  |
| m+3 |  | $G_{m+3,n-2}$ |  | $G_{m+3,n}$ |  | $G_{m+3,n+2}$ |  | $G_{m+3,n+4}$ |
| m+2 |  |  |  |  |  |  |  |  |
| m+1 |  | $G_{m+1,n-2}$ |  | $G_{m+1,n}$ |  | $G_{m+1,n+2}$ |  | $G_{m+1,n+4}$ |
| m |  |  |  |  |  |  |  |  |
| m-1 |  | $G_{m-1,n-2}$ |  | $G_{m-1,n}$ |  | $G_{m-1,n+2}$ |  | $G_{m-1,n+4}$ |
| m-2 |  |  |  |  |  |  |  |  |
| m-3 |  | $G_{m-3,n-2}$ |  | $G_{m-3,n}$ |  | $G_{m-3,n+2}$ |  | $G_{m-3,n+4}$ |

*FIG. 6*

| $G_{m-3,n-2}$ | $G_{m-1,n-2}$ | $G_{m+1,n-2}$ | $G_{m+3,n-2}$ |
|---|---|---|---|
| $G_{m-3,n}$ | $G_{m-1,n}$ | $G_{m+1,n}$ | $G_{m+3,n}$ |
| $G_{m-3,n+2}$ | $G_{m-1,n+2}$ | $G_{m+1,n+2}$ | $G_{m+3,n+2}$ |
| $G_{m-3,n+4}$ | $G_{m-1,n+4}$ | $G_{m+1,n+4}$ | $G_{m+3,n+4}$ |

GREEN 2

| $R_{m-2,n-2}$ | $R_{m,n-2}$ | $R_{m+2,n-2}$ | $R_{m+4,n-2}$ |
|---|---|---|---|
| $R_{m-2,n}$ | $R_{m,n}$ | $R_{m+2,n}$ | $R_{m+4,n}$ |
| $R_{m-2,n+2}$ | $R_{m,n+2}$ | $R_{m+2,n+2}$ | $R_{m+4,n+2}$ |
| $R_{m-2,n+4}$ | $R_{m,n+4}$ | $R_{m+2,n+4}$ | $R_{m+4,n+4}$ |

RED

| $G_{m-2,n-3}$ | $G_{m,n-3}$ | $G_{m+2,n-3}$ | $G_{m+4,n-3}$ |
|---|---|---|---|
| $G_{m-2,n-1}$ | $G_{m,n-1}$ | $G_{m+2,n-1}$ | $G_{m+4,n-1}$ |
| $G_{m-2,n+1}$ | $G_{m,n+1}$ | $G_{m+2,n+1}$ | $G_{m+4,n+1}$ |
| $G_{m-2,n+3}$ | $G_{m,n+3}$ | $G_{m+2,n+3}$ | $G_{m+4,n+3}$ |

GREEN 1

| $B_{m-3,n-3}$ | $B_{m-1,n-3}$ | $B_{m+1,n-3}$ | $B_{m+3,n-3}$ |
|---|---|---|---|
| $B_{m-3,n-1}$ | $B_{m-1,n-1}$ | $B_{m+1,n-1}$ | $B_{m+3,n-1}$ |
| $B_{m-3,n+1}$ | $B_{m-1,n+1}$ | $B_{m+1,n+1}$ | $B_{m+3,n+1}$ |
| $B_{m-3,n+3}$ | $B_{m-1,n+3}$ | $B_{m+1,n+3}$ | $B_{m+3,n+3}$ |

BLUE

|  | m-3 | m-2 | m-1 | m | m+1 | m+2 | m+3 | m+4 |
|---|---|---|---|---|---|---|---|---|
| n-3 | $DG_{m-3,n-3}$ | $G_{m-2,n-3}$ | $DG_{m-1,n-3}$ | $G_{m,n-3}$ | $DG_{m+1,n-3}$ | $G_{m+2,n-3}$ | $DG_{m+3,n-3}$ | $G_{m+4,n-3}$ |
| n-2 | $G_{m-3,n-2}$ | $DG_{m-2,n-2}$ | $G_{m-1,n-2}$ | $DG_{m,n-2}$ | $G_{m+1,n-2}$ | $DG_{m+2,n-2}$ | $G_{m+3,n-2}$ | $DG_{m+4,n-2}$ |
| n-1 | $DG_{m-3,n-1}$ | $G_{m-2,n-1}$ | $DG_{m-1,n-1}$ | $G_{m,n-1}$ | $DG_{m+1,n-1}$ | $G_{m+2,n-1}$ | $DG_{m+3,n-1}$ | $G_{m+4,n-1}$ |
| n | $G_{m-3,n}$ | $DG_{m-2,n}$ | $G_{m-1,n}$ | $DG_{m,n}$ | $G_{m+1,n}$ | $DG_{m+2,n}$ | $G_{m+3,n}$ | $DG_{m+4,n}$ |
| n+1 | $DG_{m-3,n+1}$ | $G_{m-2,n+1}$ | $DG_{m-1,n+1}$ | $G_{m,n+1}$ | $DG_{m+1,n+1}$ | $G_{m+2,n+1}$ | $DG_{m+3,n+1}$ | $G_{m+4,n+1}$ |
| n+2 | $G_{m-3,n+2}$ | $DG_{m-2,n+2}$ | $G_{m-1,n+2}$ | $DG_{m,n+2}$ | $G_{m+1,n+2}$ | $DG_{m+2,n+2}$ | $G_{m+3,n+2}$ | $DG_{m+4,n+2}$ |
| n+3 | $DG_{m-3,n+3}$ | $G_{m-2,n+3}$ | $DG_{m-1,n+3}$ | $G_{m,n+3}$ | $DG_{m+1,n+3}$ | $G_{m+2,n+3}$ | $DG_{m+3,n+3}$ | $G_{m+4,n+3}$ |
| n+4 | $G_{m-3,n+4}$ | $DG_{m-2,n+4}$ | $G_{m-1,n+4}$ | $DG_{m,n+4}$ | $G_{m+1,n+4}$ | $DG_{m+2,n+4}$ | $G_{m+3,n+4}$ | $DG_{m+4,n+4}$ |

*FIG. 13*

|  | m-3 | m-2 | m-1 | m | m+1 | m+2 | m+3 | m+4 |
|---|---|---|---|---|---|---|---|---|
| n-3 | $DG_{m-3,n-3}$ | $DG_{m-2,n-3}$ | $DG_{m-1,n-3}$ | $DG_{m,n-3}$ | $DG_{m+1,n-3}$ | $DG_{m+2,n-3}$ | $DG_{m+3,n-3}$ | $DG_{m+4,n-3}$ |
| n-2 | $G_{m-3,n-2}$ | $DG_{m-2,n-2}$ | $G_{m-1,n-2}$ | $DG_{m,n-2}$ | $G_{m+1,n-2}$ | $DG_{m+2,n-2}$ | $G_{m+3,n-2}$ | $DG_{m+4,n-2}$ |
| n-1 | $DG_{m-3,n-1}$ | $DG_{m-2,n-1}$ | $DG_{m-1,n-1}$ | $DG_{m,n-1}$ | $DG_{m+1,n-1}$ | $DG_{m+2,n-1}$ | $DG_{m+3,n-1}$ | $DG_{m+4,n-1}$ |
| n | $G_{m-3,n}$ | $DG_{m-2,n}$ | $G_{m-1,n}$ | $DG_{m,n}$ | $G_{m+1,n}$ | $DG_{m+2,n}$ | $G_{m+3,n}$ | $DG_{m+4,n}$ |
| n+1 | $DG_{m-3,n+1}$ | $DG_{m-2,n+1}$ | $DG_{m-1,n+1}$ | $DG_{m,n+1}$ | $DG_{m+1,n+1}$ | $DG_{m+2,n+1}$ | $DG_{m+3,n+1}$ | $DG_{m+4,n+1}$ |
| n+2 | $G_{m-3,n+2}$ | $DG_{m-2,n+2}$ | $G_{m-1,n+2}$ | $DG_{m,n+2}$ | $G_{m+1,n+2}$ | $DG_{m+2,n+2}$ | $G_{m+3,n+2}$ | $DG_{m+4,n+2}$ |
| n+3 | $DG_{m-3,n+3}$ | $DG_{m-2,n+3}$ | $DG_{m-1,n+3}$ | $DG_{m,n+3}$ | $DG_{m+1,n+3}$ | $DG_{m+2,n+3}$ | $DG_{m+3,n+3}$ | $DG_{m+4,n+3}$ |
| n+4 | $G_{m-3,n+4}$ | $DG_{m-2,n+4}$ | $G_{m-1,n+4}$ | $DG_{m,n+4}$ | $G_{m+1,n+4}$ | $DG_{m+2,n+4}$ | $G_{m+3,n+4}$ | $DG_{m+4,n+4}$ |

*FIG. 14*

|  | $n-3$ | $n-2$ | $n-1$ | $n$ | $n+1$ | $n+2$ | $n+3$ | $n+4$ |
|---|---|---|---|---|---|---|---|---|
| $m+4$ | | | | | | | | |
| $m+3$ | $B_{m+3,n-3}$ | | $B_{m+3,n-1}$ | | $B_{m+3,n+1}$ | | $B_{m+3,n+3}$ | |
| $m+2$ | | | | | | | | |
| $m+1$ | $B_{m+1,n-3}$ | | $B_{m+1,n-1}$ | | $B_{m+1,n+1}$ | | $B_{m+1,n+3}$ | |
| $m$ | | | | | | | | |
| $m-1$ | $B_{m-1,n-3}$ | | $B_{m-1,n-1}$ | | $B_{m-1,n+1}$ | | $B_{m-1,n+3}$ | |
| $m-2$ | | | | | | | | |
| $m-3$ | $B_{m-3,n-3}$ | | $B_{m-3,n-1}$ | | $B_{m-3,n+1}$ | | $B_{m-3,n+3}$ | |

FIG. 15

|       | m-3 | m-2 | m-1 | m | m+1 | m+2 | m+3 | m+4 |
|---|---|---|---|---|---|---|---|---|
| n-3 | $B_{m-3,n-3}$ | $DB_{m-2,n-3}$ | $B_{m-1,n-3}$ | $DB_{m,n-3}$ | $B_{m+1,n-3}$ | $DB_{m+2,n-3}$ | $B_{m+3,n-3}$ | $DB_{m+4,n-3}$ |
| n-2 | $DB_{m-3,n-2}$ | $DB_{m-2,n-2}$ | $DB_{m-1,n-2}$ | $DB_{m,n-2}$ | $DB_{m+1,n-2}$ | $DB_{m+2,n-2}$ | $DB_{m+3,n-2}$ | $DB_{m+4,n-2}$ |
| n-1 | $B_{m-3,n-1}$ | $DB_{m-2,n-1}$ | $B_{m-1,n-1}$ | $DB_{m,n-1}$ | $B_{m+1,n-1}$ | $DB_{m+2,n-1}$ | $B_{m+3,n-1}$ | $DB_{m+4,n-1}$ |
| n | $DB_{m-3,n}$ | $DB_{m-2,n}$ | $DB_{m-1,n}$ | $DB_{m,n}$ | $DB_{m+1,n}$ | $DB_{m+2,n}$ | $DB_{m+3,n}$ | $DB_{m+4,n}$ |
| n+1 | $B_{m-3,n+1}$ | $DB_{m-2,n+1}$ | $B_{m-1,n+1}$ | $DB_{m,n+1}$ | $B_{m+1,n+1}$ | $DB_{m+2,n+1}$ | $B_{m+3,n+1}$ | $DB_{m+4,n+1}$ |
| n+2 | $DB_{m-3,n+2}$ | $DB_{m-2,n+2}$ | $DB_{m-1,n+2}$ | $DB_{m,n+2}$ | $DB_{m+1,n+2}$ | $DB_{m+2,n+2}$ | $DB_{m+3,n+2}$ | $DB_{m+4,n+2}$ |
| n+3 | $B_{m-3,n+3}$ | $DB_{m-2,n+3}$ | $B_{m-1,n+3}$ | $DB_{m,n+3}$ | $B_{m+1,n+3}$ | $DB_{m+2,n+3}$ | $B_{m+3,n+3}$ | $DB_{m+4,n+3}$ |
| n+4 | $DB_{m-3,n+4}$ | $DB_{m-2,n+4}$ | $DB_{m-1,n+4}$ | $DB_{m,n+4}$ | $DB_{m+1,n+4}$ | $DB_{m+2,n+4}$ | $DB_{m+3,n+4}$ | $DB_{m+4,n+4}$ |

| | $n-3$ | $n-2$ | $n-1$ | $n$ | $n+1$ | $n+2$ | $n+3$ | $n+4$ |
|---|---|---|---|---|---|---|---|---|
| $m+4$ | $G_{m+4,n-3}$ | | $G_{m+4,n-1}$ | | $G_{m+4,n+1}$ | | $G_{m+4,n+3}$ | |
| $m+3$ | | $G_{m+3,n-2}$ | | $G_{m+3,n}$ | | $G_{m+3,n+2}$ | | $G_{m+3,n+4}$ |
| $m+2$ | $G_{m+2,n-3}$ | | $G_{m+2,n-1}$ | | $G_{m+2,n+1}$ | | $G_{m+2,n+3}$ | |
| $m+1$ | | $G_{m+1,n-2}$ | | $G_{m+1,n}$ | | $G_{m+1,n+2}$ | | $G_{m+1,n+4}$ |
| $m$ | $G_{m,n-3}$ | | $G_{m,n-1}$ 182 | | $G_{m,n+1}$ 183 | | $G_{m,n+3}$ | |
| $m-1$ | | $G_{m-1,n-2}$ | | $G_{m-1,n}$ 180 | | $G_{m-1,n+2}$ | | $G_{m-1,n+4}$ |
| $m-2$ | $G_{m-2,n-3}$ | | $G_{m-2,n-1}$ 181 | | $G_{m-2,n+1}$ | | $G_{m-2,n+3}$ | |
| $m-3$ | | $G_{m-3,n-2}$ | | $G_{m-3,n}$ | 184 | $G_{m-3,n+2}$ | | $G_{m-3,n+4}$ |
| | GREEN 1 | GREEN 2 | GREEN 1 | GREEN 2 | GREEN 1 | GREEN 2 | GREEN 1 | GREEN 2 |

GREEN IMAGE DATA PROCESSING

CROSS-REFERENCE TO RELATED APPLICATIONS

This application is a continuation of U.S. patent application Ser. No. 15/656,958, filed Jul. 21, 2017, which application is a continuation of U.S. patent application Ser. No. 15/173,232, filed Jun. 3, 2016, which application is a continuation of U.S. patent application Ser. No. 14/180,168, filed Feb. 13, 2014, which application claims priority benefit under 35 U.S.C. § 119(e) from U.S. Provisional Application Nos. 61/764,821, filed Feb. 14, 2013, and 61/778,325, filed Mar. 12, 2013. The disclosures of each of the foregoing applications are hereby incorporated by reference herein in their entireties.

BACKGROUND

Field of the Inventions

The present inventions are directed to digital cameras, such as those for capturing still or moving pictures, and more particularly, to digital cameras that compress image data.

SUMMARY

Although some currently available digital video cameras include high resolution image sensors, and thus output high resolution video, the image processing and compression techniques used on board such cameras may be too lossy and thus may eliminate too much raw image data to be acceptable in the high end portions of the market noted above. An aspect of at least one of the embodiments disclosed herein includes the realization that video quality that is acceptable for the higher end portions of the markets noted above, such as the major motion picture market, can be satisfied by cameras that can capture, compress and store raw or substantially raw video data at cinema-quality resolution and frame rates, such as at a resolution of at least about 2k or at least about 4k, and at a frame rate of at least about 23 frames per second. Examples of compressed raw data compression systems and methods are described in U.S. Pat. No. 8,174,560, which is incorporated by reference in its entirety herein.

Another aspect of various embodiments of the present disclosure includes the realization that because the human eye is more sensitive to green wavelengths than any other color, green image data based modification of image data output from an image sensor can be used to enhance compressibility of the data, yet provide a high quality video image. One such technique can include subtracting the magnitude of green light detected from the magnitudes of red and/or blue light detected prior to compressing the data. For instance, as discussed further herein, red and/or blue image data in a mosaiced (e.g., Bayer pattern) image data set can be modified based on green data in the mosaiced image data set. This can convert the red and/or blue image data into a more compressible form.

A further aspect of various embodiments of the present disclosure includes the realization that a first portion of the green image data may be used to modify a second portion of the green image data to improve compression. For example, mosaiced, raw image data (e.g., Bayer pattern image data or image data filtered using another type of color filter array [CFA]) may be composed of two green channels in addition to a red and a blue channel. As described above, green channel data may be subtracted from each of the blue and red channels to improve compressibility of the image data with little or no visual loss. According to various embodiments, this improved compressibility is possible, at least in part, because the color and/or intensity of the red and blue channels are correlated with the color and/or intensity of green channels. Accordingly, subtracting green channel data from red and/or blue channel data according to the techniques described herein may de-correlate a portion of the color and/or intensity data, improving compressibility.

According to some implementations, green image data may be modified based on other green image data, e.g., in order to improve compressibility. For instance, for Bayer pattern data, the first green channel can be used to predict a second green channel. For instance, data of a first green channel may be subtracted from data of a second green channel, and the difference or residual can be encoded, improving compressibility of the image data with little or no visual loss. Subtracting first green channel data from second green channel data may also improve compressibility as the first and second green channels may be spatially correlated with one another. Accordingly, subtracting the first green channel data from the second green channel data may also at least partially decorrelate the green image data, further improving compressibility. Moreover, green image data inherently contain more of the image detail than the red and blue planes. Embodiments described herein at least partly evolved from the realization that, using a carefully designed algorithm such as any of the ones described herein, encoding one green channel using another green channel can be done to improve compression, while still preserving an acceptable level of image detail to achieve cinema quality compressed raw image data. According to certain implementations, this modification of the green image data can be done in conjunction with any of the red/blue data modification techniques in order to further improve compressibility of the image data. In some other implementations, the green data modification is done instead of red/blue data modification.

Further, similar to the description above, the process of green image data subtraction from blue, red, and/or other green image data, can be reversed following application of lossy compression algorithms (e.g., at compression ratios of at least 3, 4, 5, 6, 7, 8, 9, 10, 11, or 12 to 1, or higher), depending on the embodiment. Moreover, the resulting system and method incorporating such a technique can provide visually lossless video image data with enhanced compressibility of such video image data.

According to an embodiment, a method of compressing mosaiced color image data is disclosed comprising: accessing mosaiced color image data acquired by one or more image sensors of a video camera, the mosaiced color image data comprising a plurality of picture element values for each of a plurality of spatially interleaved color channels, the spatially interleaved color channels comprising a first green color channel, a second green color channel, a red color channel, and a blue color channel; transforming the second green color channel at least partly by, for each respective picture element of a plurality of picture elements of the second green color channel, modifying an initial value corresponding to the respective picture element using a calculated value derived from values of a plurality of picture elements of the first green color channel that are in spatial proximity to the respective picture element; compressing the transformed second green color channel; and storing the transformed, compressed second green color in at least one memory device of the video camera along with compressed versions of the first green color channel, the red color channel, and the blue color channel.

According to an aspect, said transforming comprises subtracting the calculated value from the initial value.

According to another aspect, the calculated value comprises an average of the values of the plurality of picture elements of the first green color channel that are in spatial proximity to the respective picture element.

According to yet another aspect, the plurality of picture elements of the first green color channel in spatial proximity to the respective picture element comprise at least two picture elements which are diagonally adjacent to the respective picture element.

According to another aspect, the at least two picture elements include four picture elements of the first green color channel which are diagonally adjacent to the respective picture element.

According to yet another aspect, the plurality of picture elements of the first green color channel which are in spatial proximity to the respective picture element include at least two picture elements, further wherein the respective picture element is positioned between the at least two picture elements.

According to another aspect, the at least two picture elements include two picture elements which are diagonally opposite one another with respect to the respective picture element.

According to yet another aspect, the at least two picture elements include a first pair of picture elements which are diagonally opposite one another with respect to the respective picture element and a second pair of picture elements which are diagonally opposite one another with respect to the respective picture element.

According to another aspect, the at least two picture elements are diagonally adjacent to the respective picture element.

According to yet another aspect, the plurality of picture elements of the first green color which are in spatial proximity to the respective picture element include at least three picture elements.

According to another aspect, the color image data is mosaiced according to a Bayer pattern.

According to yet another aspect, said transforming results in a spatial decorrelation of the first green color channel from the second green color channel.

According to another aspect, the method further comprises compressing the first green color channel and storing the compressed first green color channel in the at least one memory device.

According to yet another aspect, the method further comprises: transforming the red color channel by subtracting from respective picture element values of the red color channel a calculated value derived from picture element values of one or more of the first green color channel and the second green color channel which are in spatial proximity to the respective picture element values of the red color channel; compressing the transformed red color channel; transforming the blue color channel by subtracting from respective picture element values of the blue color channel a calculated value derived from picture element values of one or more of the first green color channel and the second green color channel which are in spatial proximity to the respective picture element values of the blue color channel; compressing the transformed blue color channel; and storing the transformed, compressed red and blue color channels in the at least one memory device.

According to another aspect, said transforming results in a spatial decorrelation of one or more of the first and second green color channels from the red and blue color channels.

According to another embodiment, a video camera is disclosed comprising: at least one memory device; one or more image sensors configured to convert light incident on the image sensor into color image data, the color image data mosaiced according to a pattern and comprising a plurality of picture element values for each of a plurality of spatially interleaved color channels, the spatially interleaved color channels comprising a first green color channel, a second green color channel, a red color channel, and a blue color channel; and an image processing module configured to: transform the second green color channel at least partly by, for each respective picture element of a plurality of picture elements of the second green color channel, modifying an initial value corresponding to the respective picture element using a calculated value derived from values of a plurality of picture elements of the first green color channel that are in spatial proximity to the respective picture element; compress the transformed second green color channel; and store the transformed, compressed second green color in the memory device.

According to yet another embodiment, an apparatus for processing mosaiced color image data is disclosed comprising: at least one memory device; one or more processors; and an image processing module executing in the one or more processors and configured to: access color image data from the memory device, the color image data comprising a plurality of picture element values for each of a plurality of spatially interleaved color channels, the spatially interleaved color channels comprising a first green color channel, a second green color channel, a red color channel, and a blue color channel; and transform the second green color channel at least partly by, for each respective picture element of a plurality of picture elements of the second green color channel, modifying an initial value corresponding to the respective picture element using a calculated value derived from values of a plurality of picture elements of the first green color channel that are in spatial proximity to the respective picture element; and compress the transformed second green color channel.

According to another embodiment, a method of decoding color image data is disclosed comprising: accessing encoded color image data for a second green color channel of a plurality of color channels of the color image data, wherein the encoded, color image data was encoded at least partly by: transforming the second green color channel least partly by, for each respective picture element of a plurality of picture elements of the second green color channel, modifying an initial value corresponding to the respective picture element using a calculated value derived from values of a plurality of picture elements of a first green color channel of the plurality of color channels, the plurality of picture elements of the first green channel in spatial proximity to the respective picture element; and compressing the transformed second green color channel; and decoding the accessed color image data for the second green color channel.

According to an aspect, the decoding comprises substantially reversing the transform operation and performing a decompression operation.

According to another aspect, substantially reversing the transform operation is performed after performing the decompression operation.

According to yet another aspect, substantially reversing the transform operation is performed prior to performing the decompression operation.

BRIEF DESCRIPTION OF THE DRAWINGS

FIG. 3 is a schematic layout of an image sensor having a Bayer Pattern Filter that can be used with the system illustrated in FIG. 1, according to various embodiments.

FIG. 5 is a schematic layout of the green image data from the green sensor cells of the image sensor of FIG. 3, according to various embodiments.

FIG. 6 is a schematic layout of the remaining green image data of FIG. 5 after an optional process of deleting some of the original green image data, according to various embodiments.

FIG. 7 is a schematic layout of the red, blue, and green image data of FIG. 5 organized for processing in the image processing module of FIG. 1, according to various embodiments.

FIG. 9 is a schematic layout of blue image data resulting from an image transformation process of FIG. 8, according to various embodiments.

FIG. 10 is a schematic layout of red image data resulting from an image transformation process of FIG. 8, according to various embodiments.

FIG. 13 is a schematic layout of green image data having been decompressed and demosaiced according to the flowchart of FIG. 12, according to various embodiments.

FIG. 14 is a schematic layout of half of the original green image data from FIG. 13, having been decompressed and demosaiced according to the flowchart of FIG. 12, according to various embodiments.

FIG. 15 is a schematic layout of blue image data having been decompressed according to the flowchart of FIG. 12, according to various embodiments.

FIG. 16 is a schematic layout of blue image data of FIG. 15 having been demosaiced according to the flowchart of FIG. 12, according to various embodiments.

FIG. 17 shows an example of an application of an image transformation process involving green image data modification and including neighboring pixel selection, according to various embodiments.

DETAILED DESCRIPTION

Figure 1:
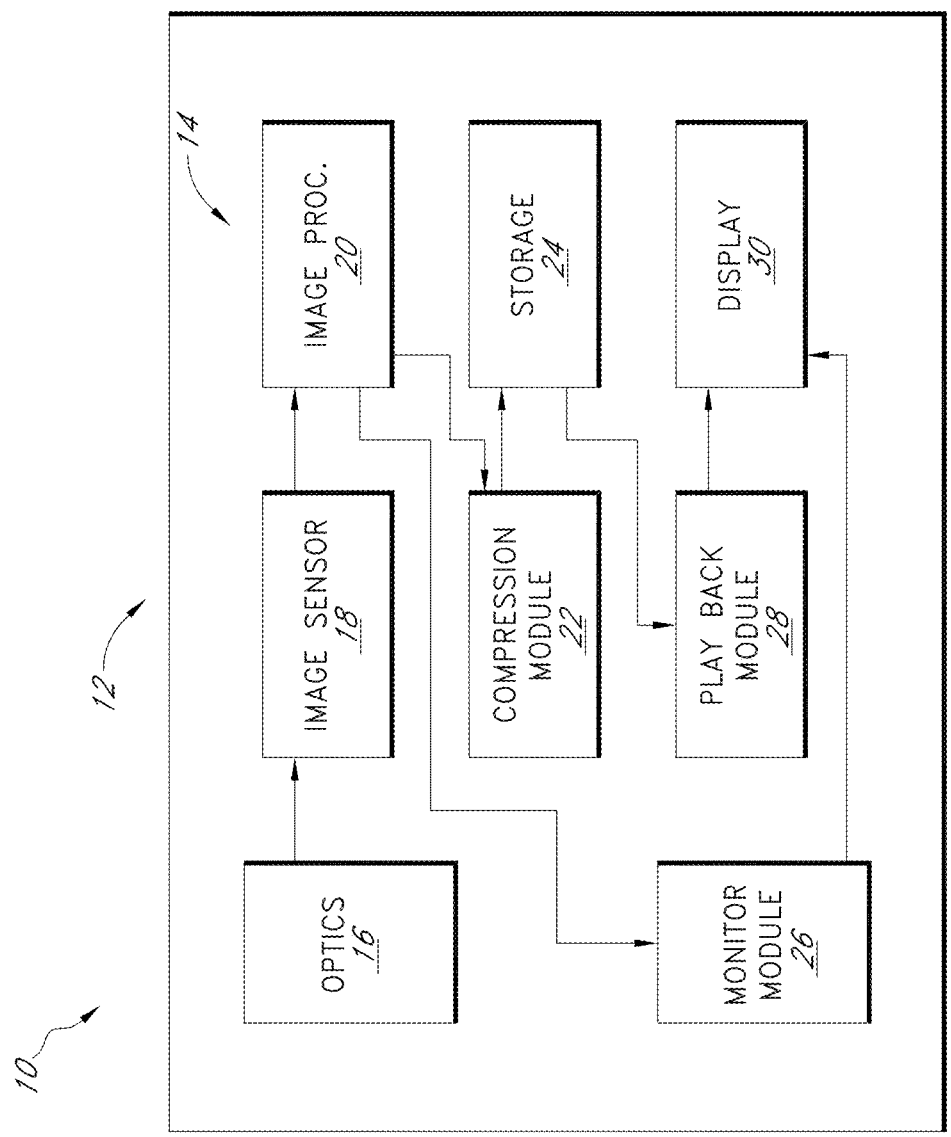
FIG. 1 is a block diagram illustrating a system that can include hardware and/or can be configured to perform methods for processing video image data in accordance with an embodiment.

FIG. 1 is a schematic diagram of a camera having image sensing, processing, and compression modules, described in the context of a video camera for moving pictures. The embodiments disclosed herein are described in the context of a video camera having a single sensor device with a Bayer pattern filter because these embodiments have particular utility in this context. However, the embodiments and inventions herein can also be applied to cameras having other types of image sensors (e.g., CMY Bayer as well as other non-Bayer patterns), other numbers of image sensors, operating on different image format types, and being configured for still and/or moving pictures. For example, the embodiments disclosed herein may be performed on image data captured using a color filter array (CFA) having a Bayer pattern or a different, non-Bayer pattern. Thus, it is to be understood that the embodiments disclosed herein are exemplary but nonlimiting embodiments, and thus, the inventions disclosed herein are not limited to the disclosed exemplary embodiments.

With continued reference to FIG. 1, a camera 10 can include a body or housing 12 configured to support a system 14 configured to detect, process, and optionally store and/or replay video image data. For example, the system 14 can include optics hardware 16, an image sensor 18, an image processing module 20, a compression module 22, and a storage device 24. Optionally, the camera 10 can also include a monitor module 26, a playback module 28, and a display 30.

Figure 2:
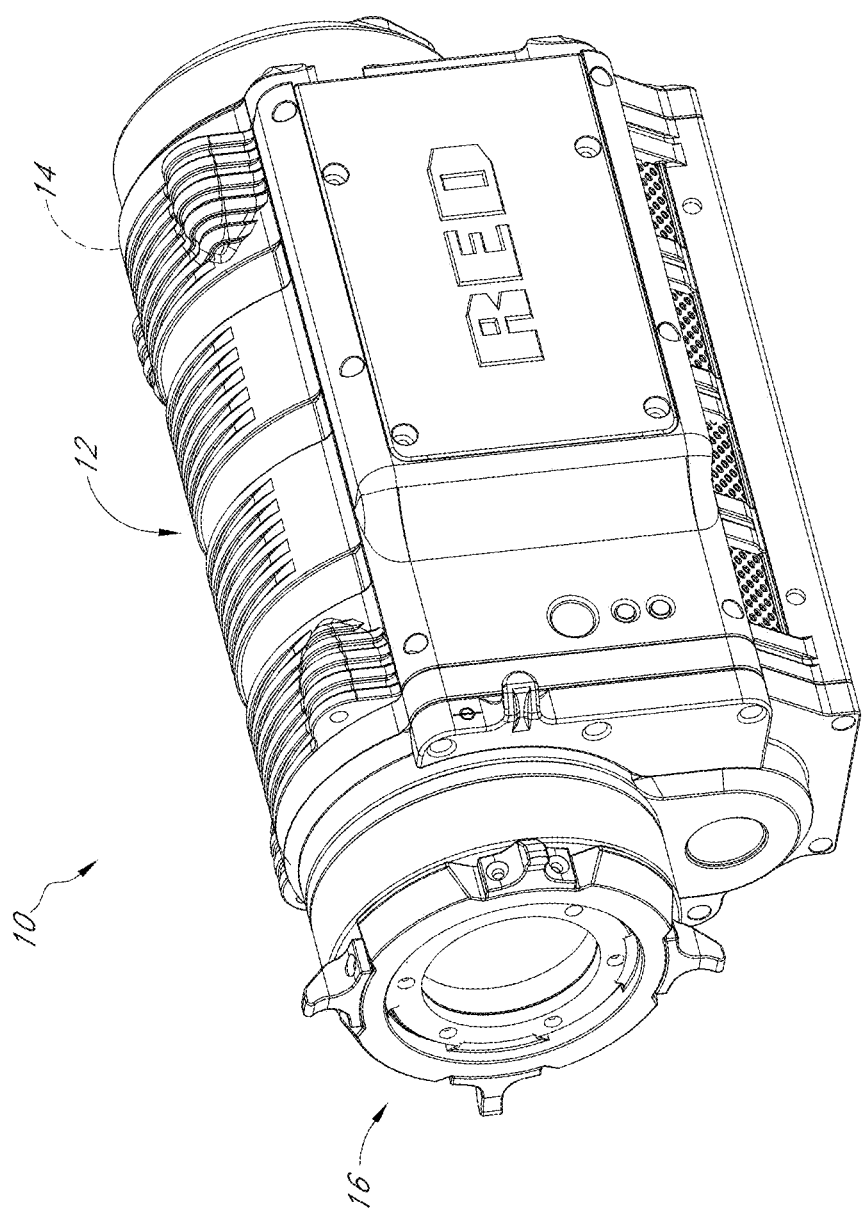
FIG. 2 is an optional embodiment of a housing for the camera schematically illustrated in FIG. 1, according to an embodiment.

FIG. 2 illustrates a nonlimiting exemplary embodiment of the camera 10. As shown in FIG. 2, the optics hardware 16 can be supported by the housing 12 in a manner that leaves it exposed at its outer surface. In some embodiments, the system 14 is supported within the housing 12. For example, the image sensor 18, image processing module 20, and the compression module 22 can be housed within the housing 12. The storage device 24 can be mounted in the housing 12. Additionally, in some embodiments, the storage device 24 can be mounted to an exterior of the housing 12 and connected to the remaining portions of the system 14 through any type of known connector or cable. Additionally, the storage device 24 can be connected to the housing 12 with a flexible cable, thus allowing the storage device 24 to be moved somewhat independently from the housing 12. For example, with such a flexible cable connection, the storage device 24 can be worn on a belt of a user, allowing the total weight of the housing 12 to be reduced. Further, in some embodiments, the housing can include one or more storage devices 24 inside and mounted to its exterior. Additionally, the housing 12 can also support the monitor module 26, and playbook module 28. Additionally, in some embodiments, the display 30 can be configured to be mounted to an exterior of the housing 12.

The optics hardware 16 can be in the form of a lens system having at least one lens configured to focus an incoming image onto the image sensor 18. The optics hardware 16, optionally, can be in the form of a multi-lens system providing variable zoom, aperture, and focus. Additionally, the optics hardware 16 can be in the form of a lens socket supported by the housing 12 and configured to receive a plurality of different types of lens systems for example, but without limitation, the optics hardware 16 include a socket configured to receive various sizes of lens systems including a 50-100 millimeter (F2.8) zoom lens, an 18-50 millimeter (F2.8) zoom lens, a 300 millimeter (F2.8) lens, 15 millimeter (F2.8) lens, 25 millimeter (F1.9) lens, 35 millimeter (F1.9) lens, 50 millimeter (F1.9) lens, 85 millimeter (F1.9) lens, and/or any other lens. As noted above, the optics hardware 16 can be configured such that despite which lens is attached thereto, images can be focused upon a light-sensitive surface of the image sensor 18.

The image sensor 18 can be any type of video sensing device, including, for example, but without limitation, CCD, CMOS, vertically-stacked CMOS devices such as the Foveon® sensor, or a multi-sensor array using a prism to divide light between the sensors. In some embodiments, the image sensor 18 can include a CMOS device having about 12 million photocells. However, other size sensors can also be used. In some configurations, camera 10 can be configured to record and/or output video (e.g., compressed raw video) at "2 k" (e.g., 2048×1152 pixels), "4 k" (e.g., 4,096× 2,540 pixels), "4.5 k" horizontal resolution, "5 k" horizontal resolution (e.g., 5120×2700 pixels), "6 k" horizontal resolution (e.g., 6144×3160), or greater resolutions. In some embodiments, the camera can be configured to record compressed raw image data having a horizontal resolution of between at least any of the above-recited resolutions. In further embodiments, the resolution is between at least one of the aforementioned values (or some value between the aforementioned values) and about 6.5 k, 7 k, 8 k, 9 k, or 10 k, or some value therebetween). As used herein, in the terms expressed in the format of xk (such as 2 k and 4 k noted above), the "x" quantity refers to the approximate horizontal resolution. As such, "4 k" resolution corresponds to about 4000 or more horizontal pixels and "2 k" corresponds to about 2000 or more pixels. Using currently commercially available hardware, the sensor can be as small as about 0.5 inches (8 mm), but it can be about 1.0 inches, or larger. Additionally, the image sensor 18 can be configured to provide variable resolution by selectively outputting only a predetermined portion of the sensor 18. For example, the sensor 18 and/or the image processing module can be configured to allow a user to identify the resolution of the image data output.

The camera 10 can also be configured to downsample and subsequently process the output of the sensor 18 to yield video output at 2K, 1080p, 720p, or any other resolution. For example, the image data from the sensor 18 can be "windowed", thereby reducing the size of the output image and allowing for higher readout speeds. However, other size sensors can also be used. Additionally, the camera 10 can be configured to upsample the output of the sensor 18 to yield video output at higher resolutions.

With reference to FIGS. 1 and 3, in some embodiments, the sensor 18 can include a Bayer pattern filter. As such, the sensor 18, by way of its chipset (not shown) outputs data representing magnitudes of red, green, or blue light detected by individual photocells of the image sensor 18. FIG. 3 schematically illustrates the Bayer pattern output of the sensor 18. In some embodiments, for example, as shown in FIG. 3, the Bayer pattern filter has twice as many green elements as the number of red elements and the number of blue elements. The chipset of the image sensor 18 can be used to read the charge on each element of the image sensor and thus output a stream of values in the well-known RGB format output.

Figure 4:
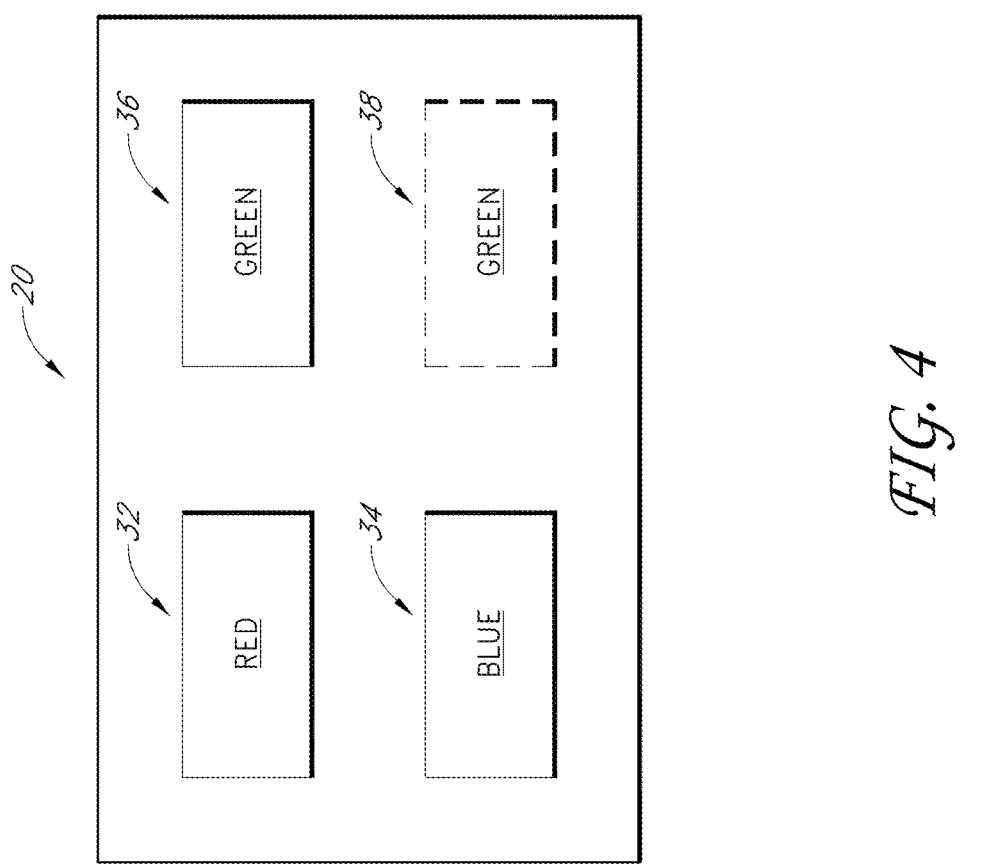
FIG. 4 is a schematic block diagram of an image processing module that can be used in the system illustrated in FIG. 1, according to various embodiments.

With continued reference to FIG. 4, the image processing module 20 optionally can be configured to format the data stream from the image sensor 18 in any known manner. In some embodiments, the image processing module 20 can be configured to separate the green, red, and blue image data into three or four separate data compilations. For example, the image processing module 20 can be configured to separate the red data into one data element, the blue data into one blue data element, and the green data into one green data element. For example, with reference to FIG. 4, the image processing module 20 can include a red data processing module 32, a blue data image processing module 34, and a first green image data processing module 36.

As noted above, however, the Bayer pattern data illustrated in FIG. 3, has twice as many green pixels as the other two colors. FIG. 5 illustrates a data component with the blue and red data removed, leaving only the original green image data.

In some embodiments, the camera 10 can be configured to delete or omit some of the green image data. For example, in some embodiments, the image processing module 20 can be configured to delete ½ of the green image data so that the total amount of green image data is the same as the amounts of blue and red image data. For example, FIG. 6 illustrates the remaining data after the image processing module 20 deletes ½ of the green image data. In the illustrated embodiment of FIG. 6, the rows n−3, n−1, n+1, and n+3 have been deleted. This is merely one example of the pattern of green image data that can be deleted. Other patterns and other amounts of green image data can also be deleted.

In some alternatives, the camera 10 can be configured to delete ½ of the green image data after the red and blue image data has been transformed based on the green image data. This optional technique is described below following the description of the subtraction of green image data values from the other color image data.

Optionally, the image processing module 20 can be configured to selectively delete green image data. For example, the image processing module 20 can include a deletion analysis module (not shown) configured to selectively determine which green image data to delete. For example, such a deletion module can be configured to determine if deleting a pattern of rows from the green image data would result in aliasing artifacts, such as Moiré lines, or other visually perceptible artifacts. The deletion module can be further configured to choose a pattern of green image data to delete that would present less risk of creating such artifacts. For example, the deletion module can be configured to choose a green image data deletion pattern of alternating vertical columns if it determines that the image captured by the image sensor 18 includes an image feature characterized by a plurality of parallel horizontal lines. This deletion pattern can reduce or eliminate artifacts, such as Moiré lines, that might have resulted from a deletion pattern of alternating lines of image data parallel to the horizontal lines detected in the image.

However, this merely one exemplary, non-limiting example of the types of image features and deletion patterns that can be used by the deletion module. The deletion module can also be configured to detect other image features and to use other image data deletion patterns, such as for example, but without limitation, deletion of alternating rows, alternating diagonal lines, or other patterns. Additionally, the deletion module can be configured to delete portions of the other image data, such as the red and blue image data, or other image data depending on the type of sensor used.

Additionally, the camera 10 can be configured to insert a data field into the image data indicating what image data has been deleted. For example, but without limitation, the camera 10 can be configured to insert a data field into the beginning of any video clip stored into the storage device 24, indicating what data has been deleted in each of the "frames" of the video clip. In some embodiments, the camera can be configured to insert a data field into each frame captured by the sensor 18, indicating what image data has been deleted. For example, in some embodiments, where the image processing module 20 is configured to delete ½ of the green image data in one deletion pattern, the data field can be as small as a single bit data field, indicating whether or not image data has been deleted. Since the image processing module 20 is configured to delete data in only one pattern, a single bit is sufficient to indicate what data has been deleted.

In some embodiments, as noted above, the image processing module 20 can be configured to selectively delete image data in more than one pattern. Thus, the image data deletion field can be larger, including a sufficient number of values to provide an indication of which of the plurality of different image data deletion patterns was used. This data field can be used by downstream components and or processes to determine to which spatial positions the remaining image data corresponds.

In some embodiments, the image processing module can be configured to retain all of the raw green image data, e.g., the data shown in FIG. 5. In such embodiments, the image processing module can include one or more green image data processing modules.

As noted above, in known Bayer pattern filters, there are twice as many green elements as the number of red elements and the number of blue elements. In other words, the red elements comprise 25% of the total Bayer pattern array, the blue elements corresponded 25% of the Bayer pattern array and the green elements comprise 50% of the elements of the Bayer pattern array. Thus, in some embodiments, where all of the green image data is retained, the image processing module 20 can include a second green data image processing module 38. As such, the first green data image processing module 36 can process half of the green elements and the second green image data processing module 38 can process the remaining green elements. However, the present inventions can be used in conjunction with other types of patterns, such as for example, but without limitation, CMY and RGBW.

FIG. 7 includes schematic illustrations of the red, blue and two green data components processed by modules 32, 34, 36, and 38 (FIG. 4). This can provide further advantages because the size and configuration of each of these modules can be about the same since they are handling about the same amount of data. Additionally, the image processing module 20 can be selectively switched between modes in which is processes all of the green image data (by using both modules 36 and 38) and modes where ½ of the green image data is deleted (in which it utilizes only one of modules 36 and 38). However, other configurations can also be used.

Additionally, in some embodiments, the image processing module 20 can include other modules and/or can be configured to perform other processes, such as, for example, but without limitation, gamma correction processes, noise filtering processes, etc.

Additionally, in some embodiments, the image processing module 20 can be configured to subtract a value of a green element from a value of a blue element and/or red element. As such, in some embodiments, when certain colors are detected by the image sensor 18, the corresponding red or blue element can be reduced to zero. For example, in many photographs, there can be large areas of black, white, or gray, or a color shifted from gray toward the red or blue colors. Thus, if the corresponding pixels of the image sensor 18 have sensed an area of gray, the magnitude of the green, red, and blue, would be about equal. Thus, if the green value is subtracted from the red and blue values, the red and blue values will drop to zero or near zero. Thus, in a subsequent compression process, there will be more zeros generated in pixels that sense a black, white, or gray area and thus the resulting data will be more compressible. Additionally, the subtraction of green from one or both of the other colors can make the resulting image data more compressible for other reasons.

Such a technique can help achieve a higher effective compression ratio and yet remain visually lossless due to its relationship to the entropy of the original image data. For example, the entropy of an image is related to the amount of randomness in the image. The subtraction of image data of one color, for example, from image data of the other colors can reduce the randomness, and thus reduce the entropy of the image data of those colors, thereby allowing the data to be compressed at higher compression ratios with less loss. Typically, an image is not a collection of random color values. Rather, there is often a certain degree of correlation between surrounding picture elements. Thus, such a subtraction technique can use the correlation of picture elements to achieve better compression. The amount of compression will depend, at least in part, on the entropy of the original information in the image.

In some embodiments, the magnitudes subtracted from a red or blue pixel can be the magnitude of the value output from a green pixel adjacent to the subject red or blue pixel. Further, in some embodiments, the green magnitude subtracted from the red or blue elements can be derived from an average of the surrounding green elements. Such techniques are described in greater detail below. However, other techniques can also be used.

Optionally, the image processing module 20 can also be configured to selectively subtract green image data from the other colors. For example, the image processing module 20 can be configured to determine if subtracting green image data from a portion of the image data of either of the other colors would provide better compressibility or not. In this mode, the image processing module 20 can be configured to insert flags into the image data indicating what portions of the image data has been modified (by e.g., green image data subtraction) and which portions have not been so modified. With such flags, a downstream demosaicing/reconstruction component can selectively add green image values back into the image data of the other colors, based on the status of such data flags.

Optionally, image processing module 20 can also include a further data reduction module (not shown) configured to round values of the red and blue data. For example, if, after the subtraction of green magnitudes, the red or blue data is near zero (e.g., within one or two on an 8-bit scale ranging from 0-255 or higher magnitudes for a higher resolution system). For example, the sensor 18 can be a 12-bit sensor outputting red, blue, and green data on a scale of 0-4095. Any rounding or filtering of the data performed the rounding module can be adjusted to achieve the desired effect. For example, rounding can be performed to a lesser extent if it is desired to have lossless output and to a greater extent if some loss or lossy output is acceptable. Some rounding can be performed and still result in a visually lossless output. For example, on a 8-bit scale, red or blue data having absolute value of up to 2 or 3 can be rounded to 0 and still provide a visually lossless output. Additionally, on a 12-bit scale, red or blue data having an absolute value of up to 10 to 20 can be rounded to 0 and still provide visually lossless output.

Additionally, the magnitudes of values that can be rounded to zero, or rounded to other values, and still provide a visually lossless output depends on the configuration of the system, including the optics hardware 16, the image sensor 18, the resolution of the image sensor, the color resolution (bit) of the image sensor 18, the types of filtering, anti-aliasing techniques or other techniques performed by the image processing module 20, the compression techniques performed by the compression module 22, and/or other parameters or characteristics of the camera 10.

As noted above, in some embodiments, the camera 10 can be configured to delete ½ of the green image data after the red and blue image data has been transformed based on the green image data. For example, but without limitation, the processor module 20 can be configured to delete ½ of the green image data after the average of the magnitudes of the surrounding green data values have been subtracted from the red and blue data values. This reduction in the green data can reduce throughput requirements on the associated hardware. Additionally, the remaining green image data can be used to reconstruct the red and blue image data, described in greater detail below with reference to FIGS. 14 and 16.

As noted above, the camera 10 can also include a compression module 22. The compression module 22 can be in the form of a separate chip or it can be implemented with software and another processor. For example, the compression module 22 can be in the form of a commercially available compression chip that performs a compression technique in accordance with the JPEG 2000 standard, or other compression techniques. In some embodiments, the image processing module 20 and/or the compression module 22 are implemented in a field-programmable gate array (FPGA), an application-specific integrated circuit (ASIC), combinations of the same or the like.

The compression module 22 can be configured to perform any type of compression process on the data from the image processing module 20. In some embodiments, the compression module 22 performs a compression technique that takes advantage of the techniques performed by the image processing module 20. For example, as noted above, the image processing module 20 can be configured to reduce the magnitude of the values of the red and blue data by subtracting the magnitudes of green image data, thereby resulting in a greater number of zero values, as well as other effects. Additionally, the image processing module 20 can perform a manipulation of raw data that uses the entropy of the image data. Thus, the compression technique performed by the compression module 22 can be of a type that benefits from the presence of larger strings of zeros to reduce the size of the compressed data output therefrom.

Further, the compression module 22 can be configured to compress the image data from the image processing module 20 to result in a visually lossless output. For example, firstly, the compression module can be configured to apply any known compression technique, such as, but without limitation, JPEG 2000, MotionJPEG, any DCT based codec, any codec designed for compressing RGB image data, H.264, MPEG4, Huffman, or other techniques.

Depending on the type of compression technique used, the various parameters of the compression technique can be set to provide a visually lossless output. For example, many of the compression techniques noted above can be adjusted to different compression rates, wherein when decompressed, the resulting image is better quality for lower compression rates and lower quality for higher compression rates. Thus, the compression module can be configured to compress the image data in a way that provides a visually lossless output, or can be configured to allow a user to adjust various parameters to obtain a visually lossless output. For example, the compression module 22 can be configured to compress the image data at a compression ratio of about 6:1, 7:1, 8:1 or greater. In some embodiments, the compression module 22 can be configured to compress the image data to a ratio of 12:1 or higher.

Additionally, the compression module 22 can be configured to allow a user to adjust the compression ratio achieved by the compression module 22. For example, the camera 10 can include a user interface that allows a user to input commands that cause the compression module 22 to change the compression ratio. Thus, in some embodiments, the camera 10 can provide for variable compression.

As used herein, the term "visually lossless" is intended to include output that, when compared side by side with original (never compressed) image data on the same display device, one of ordinary skill in the art would not be able to determine which image is the original with a reasonable degree of accuracy, based only on a visual inspection of the images.

With continued reference to FIG. 1, the camera 10 can also include a storage device 24. The storage device can be in the form of any type of digital storage, such as, for example, but without limitation, hard disks, flash memory, or any other type of memory device. In some embodiments, the size of the storage device 24 can be sufficiently large to store image data from the compression module 22 corresponding to at least about 30 minutes of video at 12 mega pixel resolution, 12-bit color resolution, and at 60 frames per second. However, the storage device 24 can have any size.

In some embodiments, the storage device 24 can be mounted on an exterior of the housing 12. Further, in some embodiments, the storage device 24 can be connected to the other components of the system 14 through standard communication ports, including, for example, but without limitation, IEEE 1394, USB 2.0, IDE, SATA, etc. Further, in some embodiments, the storage device 24 can comprise a plurality of hard drives operating under a RAID protocol. However, any type of storage device can be used.

With continued reference to FIG. 1, as noted above, in some embodiments, the system can include a monitor module 26 and a display device 30 configured to allow a user to view video images captured by the image sensor 18 during operation. In some embodiments, the image processing module 20 can include a subsampling system configured to output reduced resolution image data to the monitor module 26. For example, such a subsampling system can be configured to output video image data to support 2K, 1080p, 720p, or any other resolution. In some embodiments, filters used for demosaicing can be adapted to also perform downsampling filtering, such that downsampling and filtering can be performed at the same time. The monitor module 26 can be configured to perform any type of demosaicing process to the data from the image processing module 20. Thereafter, the monitor module 26 can output a demosaiced image data to the display 30.

The display 30 can be any type of monitoring device. For example, but without limitation, the display 30 can be a four-inch LCD panel supported by the housing 12. For example, in some embodiments, the display 30 can be connected to an infinitely adjustable mount configured to allow the display 30 to be adjusted to any position relative to the housing 12 so that a user can view the display 30 at any angle relative to the housing 12. In some embodiments, the display 30 can be connected to the monitor module through any type of video cables such as, for example, an RGB or YCC format video cable.

Optionally, the playback module 28 can be configured to receive data from the storage device 24, decompressed and demosaic the image data and then output the image data to the display 30. In some embodiments, the monitor module 26 and the playback module 28 can be connected to the display through an intermediary display controller (not shown). As such, the display 30 can be connected with a single connector to the display controller. The display controller can be configured to transfer data from either the monitor module 26 or the playback module 28 to the display 30.

Figure 8:
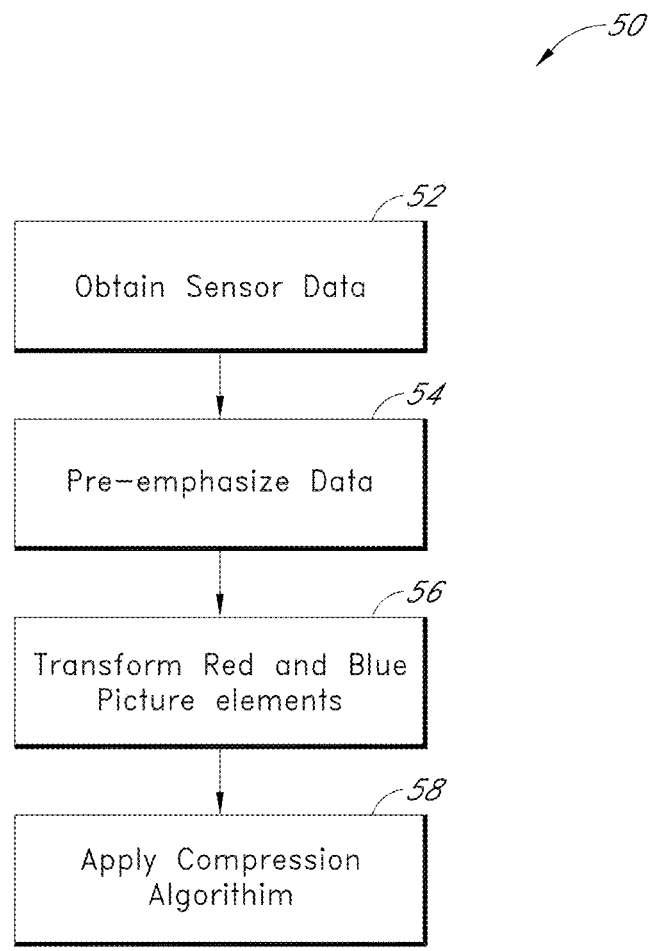
FIG. 8 is a flowchart illustrating an image data transformation technique that can be used with the system illustrated in FIG. 1, according to various embodiments.

FIG. 8 includes a flowchart 50 illustrating the processing of image data by the camera 10. In some embodiments, the flowchart 50 can represent a control routine stored in a memory device, such as the storage device 24, or another storage device (not shown) within the camera 10. Additionally, a central processing unit (CPU) (not shown) can be configured to execute the control routine. The below description of the methods corresponding to the flow chart 50 are described in the context of the processing of a single frame of video image data. Thus, the techniques can be applied to the processing of a single still image. These processes can also be applied to the processing of continuous video, e.g., frame rates of greater than 12, as well as frame rates of 20, 23.98, 24, 25, 29.97, 30, 47.96, 48, 50, 59.94, 60, 120, 250, frames per second, or other frame rates between these frame rates or greater.

With continued reference to FIG. 8, control routine can begin at operation block 52. In the operation block 52, the camera 10 can obtain sensor data. For example, with reference to FIG. 1, the image sensor 18, which can include a Bayer Sensor and chipset, can output image data.

For example, but without limitation, with reference to FIG. 3, the image sensor can comprise a CMOS device having a Bayer pattern filter on its light receiving surface. Thus, the focused image from the optics hardware 16 is focused on the Bayer pattern filter on the CMOS device of the image sensor 18. FIG. 3 illustrates an example of the Bayer pattern created by the arrangement of Bayer pattern filter on the CMOS device.

In FIG. 3, column m is the fourth column from the left edge of the Bayer pattern and row n is the fourth row from the top of the pattern. The remaining columns and rows are labeled relative to column m and row n. However, this layout is merely chosen arbitrarily for purposes of illustration, and does not limit any of the embodiments or inventions disclosed herein.

As noted above, known Bayer pattern filters often include twice as many green elements as blue and red elements. In the pattern of FIG. 5, blue elements only appear in rows n−3, n−1, n+1, and n+3. Red elements only appear in rows n−2, n, n+2, and n+4. However, green elements appear in all rows and columns, interspersed with the red and blue elements.

Thus, in the operation block 52, the red, blue, and green image data output from the image sensor 18 can be received by the image processing module 20 and organized into separate color data components, such as those illustrated in FIG. 7. As shown in FIG. 7, and as described above with reference to FIG. 4, the image processing module 20 can separate the red, blue, and green image data into four separate components. FIG. 7 illustrates two green components (Green 1 and Green 2), a blue component, and a red component. However, this is merely one exemplary way of processing image data from the image sensor 18. Additionally, as noted above, the image processing module 20, optionally, can arbitrarily or selectively delete ½ of the green image data.

After the operation block 52, the flowchart 50 can move on to operation block 54. In the operation block 54, the image data can be further processed. For example, optionally, any one or all of the resulting data (e.g., green 1, green 2, the blue image data from FIG. 9, and the red image data from FIG. 10) can be further processed.

For example, the image data can be pre-emphasized or processed in other ways. In some embodiments, the image data can be processed to be more (mathematically) non-linear. Some compression algorithms benefit from performing such a linearization on the picture elements prior to compression. However, other techniques can also be used. For example, the image data can be processed with a linear curve, which provides essentially no emphasis.

For instance, the image data may represent linear light sensor data, and the pre-emphasis curve can be designed to preserve detail in darker regions upon application of the compression algorithm. For instance, the pre-emphasis function can be designed emphasize darker image data values in comparison to brighter image data values, e.g., by applying a log curve or other appropriate function that weights darker image data values higher than brighter image data values. In some cases, the pre-emphasis curve may cause some reduction in precision in highlights or other relatively brighter image regions while preserving detail in shadows or other darker image regions. In some embodiments, the operation block 54 can process the image data using curve defined by the function $y=x^{0.5}$. In some embodiments, this curve can be used where the image data was, for example but without limitation, floating point data in the normalized 0-1 range. In other embodiments, for example, where the image data is 12-bit data, the image can be processed with the curve $y=(x/4095)^{0.5}$. Additionally, the image data can be processed with other curves, such as $y=(x+c)^g$ where $0.01<g<1$ and c is an offset, which can be 0 in some embodiments. Additionally, log curves can also be used. For example, curves in the form $y=A*\log(B*x+C)$ where A, B, and C are constants chosen to provide the desired results. The pre-emphasis curve according to certain embodiments does not reduce the bit depth of the image data. Additionally, the above curves and processes can be modified to provide more linear areas in the vicinity of black, similar to those techniques utilized in the well-known Rec709 gamma curve. In applying these processes to the image data, the same processes can be applied to all of the image data, or different processes can be applied to the different colors of image data. However, these are merely exemplary curves that can be used to process the image data, or curves or transforms can also be used. Additionally, these processing techniques can be applied using mathematical functions such as those noted above, or with Look Up Tables (LUTs). Additionally, different processes, techniques, or transforms can be used for different types of image data, different ISO settings used during recording of the image data, temperature (which can affect noise levels), etc.

After the operation block 54, the flowchart 50 can move to an operation block 56. In the operation block 56, the red and blue picture elements can be transformed. For example, as noted above, green image data can be subtracted from each of the blue and red image data components. In some embodiments, a red or blue image data value can be transformed by subtracting a green image data value of at least one of the green picture elements adjacent to the red or blue picture element. In some embodiments, an average value of the data values of a plurality of adjacent green picture elements can be subtracted from the red or blue image data value. For example, but without limitation, average values of 2, 3, 4, or more green image data values can be calculated and subtracted from red or blue picture elements in the vicinity of the green picture elements.

For example, but without limitation, with reference to FIG. 3, the raw output for the red element $R_{m-2,n-2}$ (also referred to as the "target" pixel or element) is surrounded by four green picture elements $G_{m-2,n-3}$, $G_{m-1,n-2}$, $G_{m-3,n-2}$, and $G_{m-2,n-1}$. Thus, the red element $R_{m-2,n-2}$ can be transformed by subtracting the average of the values of the green elements surrounding the target element as follows:

$$R_{m,n}=R_{m,n}-(G_{m,n-1}+G_{m+1,n}+G_{m,n+1}+G_{m-1,n})/4 \tag{1}$$

Similarly, the blue elements can be transformed in a similar manner by subtracting the average of the green elements surrounding the blue target element as follows:

$$B_{m+1,n+1}=B_{m+1,n+1}-(G_{m+1,n}+G_{m+2,n+1}+G_{m+1,n+2}+G_{m,n+1})/4 \tag{2}$$

Figure 9:
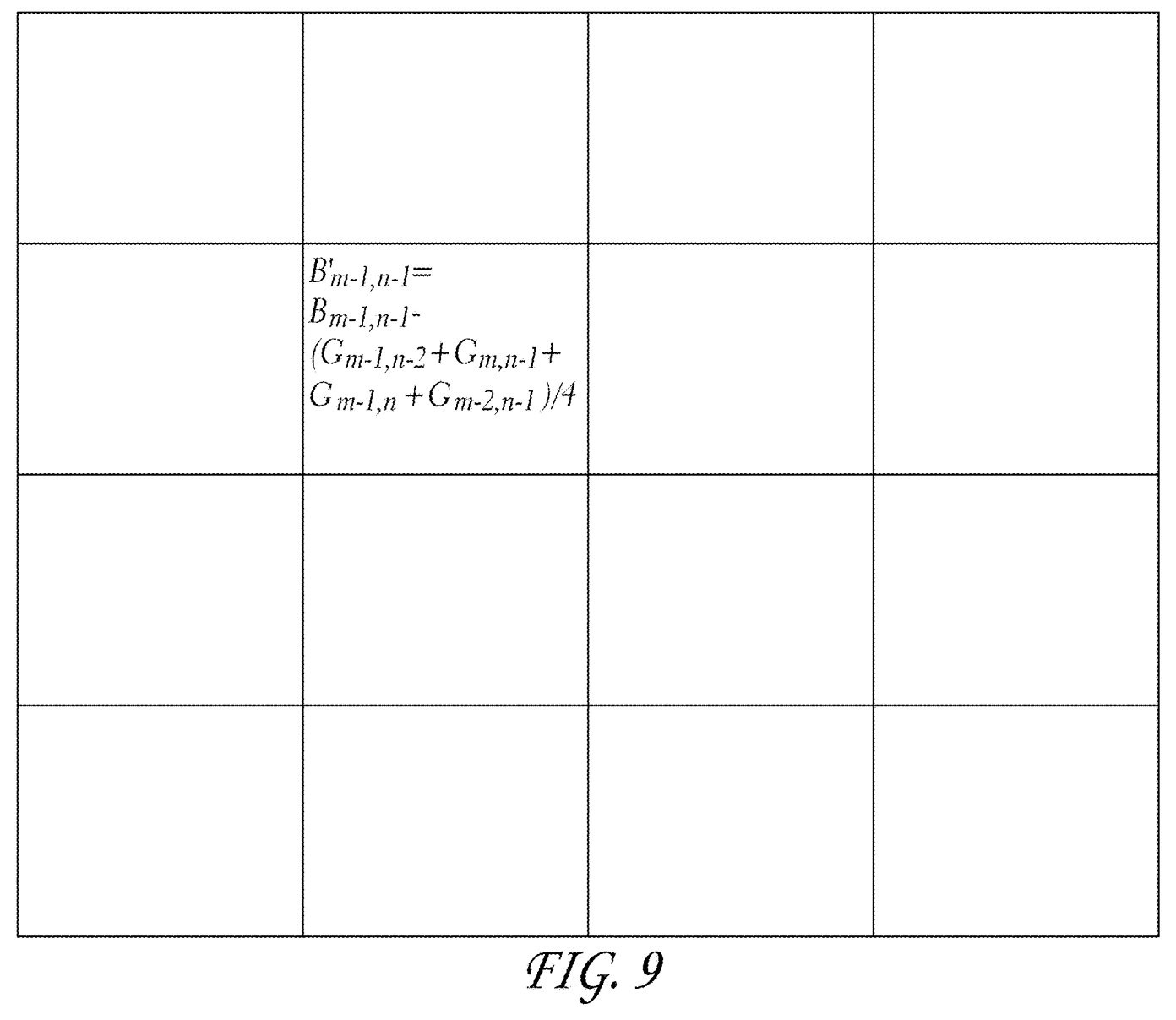
Figure 10:
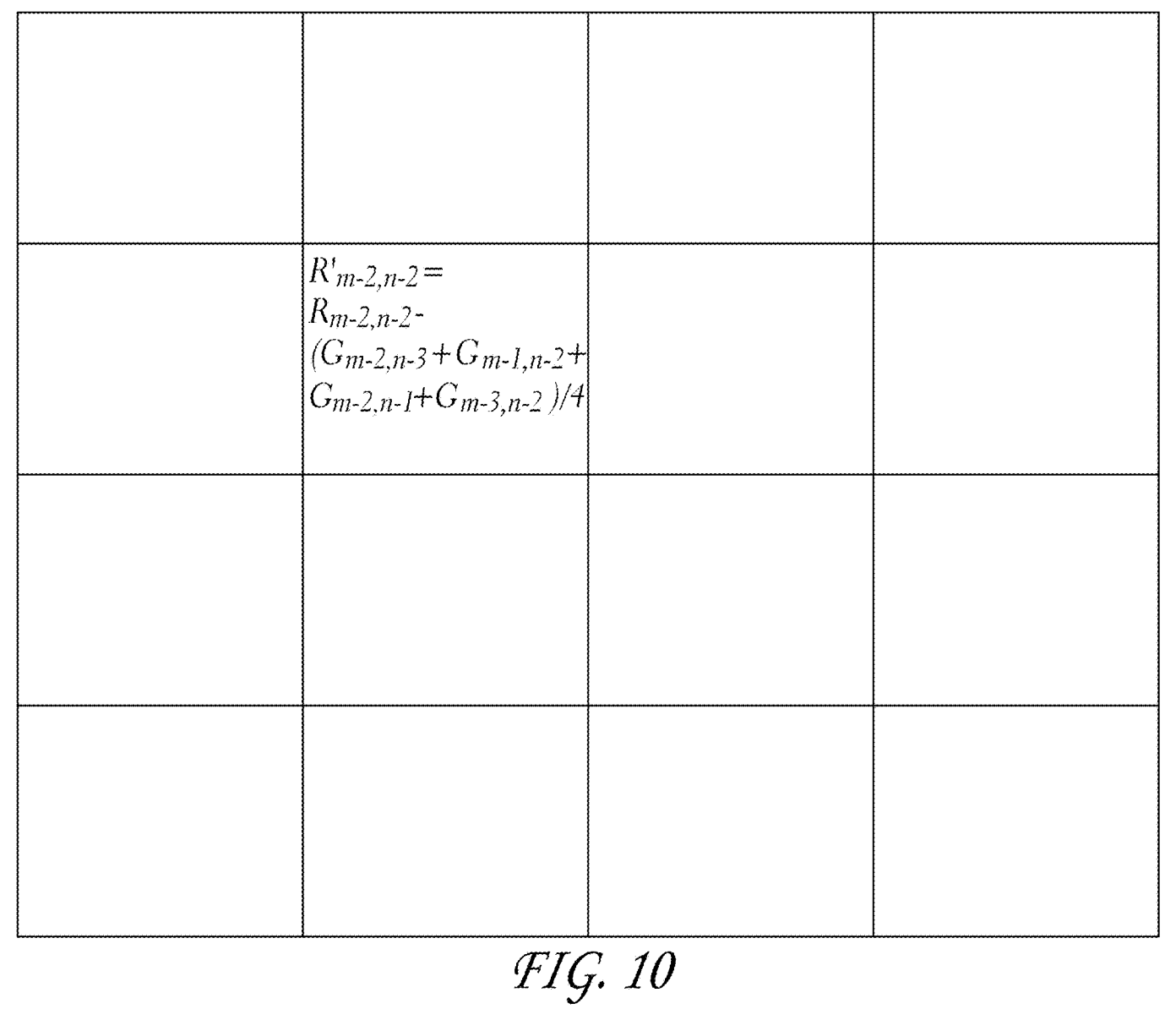

FIG. 9 illustrates a resulting blue data component where the original blue raw data $B_{m-1,n-1}$ (e.g., the target pixel) is transformed, the new value labeled as $B'_{m-1,n-1}$ (only one value in the component is filled in and the same technique can be used for all the blue elements). Similarly, FIG. 10 illustrates the red data component having been transformed in which the transformed red element $R_{m-2,n-2}$ (e.g., the target pixel) is identified as $R'_{m-2,n-2}$. The mathematical process performed on the data are entirely reversible such that all of the original values can be obtained by reversing those processes.

With continued reference to FIG. 8, after the operation block 56, the flowchart 50 can move on to an operation block 58. In the operation block 58, the resulting data, which is raw or can be substantially raw, can be further compressed to using any known compression algorithm and which is according to various implementations a lossy compression algorithm (e.g., a compression algorithm capable of achieving compression ratios of at least 3, 4, 5, 6, 7, 8, 9, 10, 11, or 12 to 1, or higher). For example, the compression module 22 (FIG. 1) can be configured to perform such a compression algorithm. After compression, the compressed raw data can be stored in the storage device 24 (FIG. 1). According to certain embodiments, the term "raw" as used herein in conjunction with compressed image data remains mosaiced (e.g., according to a Bayer pattern or is mosaiced according to some other color filter array) and has therefore not undergone a demosaicing operation prior to compression. According to various implementations, the term "raw" can indicate that the image data has not undergone any combination of one or more of the following operations prior to compression: demosaicing (sometimes alternatively referred to as "color interpolation"), color correction (sometimes alternatively referred to as "color compensation" or "color matrix processing"), tonal processing (e.g., application of tonal curves, contrast enhancement), gamma processing (sometimes alternatively referred to as "gamma correction") prior to compression.

In various embodiments, the flowchart 50 of FIG. 8 may further include one or more denoising and/or noise reduction operation blocks. For example, a denoising operation block may be included after the transforming of operation block 56. For example, the denoising step can include noise removal techniques, such as spatial denoising where a single image frame is used for noise suppression in a pixel or picture element. Temporal denoising methods that use multiple image frames for noise correction can also be employed, including motion adaptive, semi-motion adaptive, or motion compensative methods. Additionally, other noise removal methods can be used to remove noise from images or a video signal. Various example noise removal techniques are described in detail in U.S. Provisional Application 61/764,821 (the "'821 application") and U.S. Pat. No. 8,237,830 (the "'830 patent"), which are incorporated by reference herein in their entirety.

In some embodiments, a denoising stage may occur before compression in operation block 58. Removing noise from data prior to compression can be advantageous because it can greatly improve the effectiveness of the compression process. In some embodiments, noise removal can be done as part of the compression process in operation block 58.

In various embodiments, a denoising stage can occur at numerous points in the image data transformation process. For example, denoising can be applied after operation block 52 to raw image data from an image sensor prior to transformation; or to Bayer pattern (or other mosaiced) data after the transformation in operation block 56. In some embodiments, denoising can be applied before or after the pre-emphasis of data that occurs in operation block 54. Of note, denoising data before pre-emphasis can be advantageous because denoising can operate more effectively on perceptually linear data. In addition, in exemplary embodiments, green image data can be denoised before operation block 56 to minimize noise during the transformation process of red and blue picture elements in operation block 56.

Figure 8A:
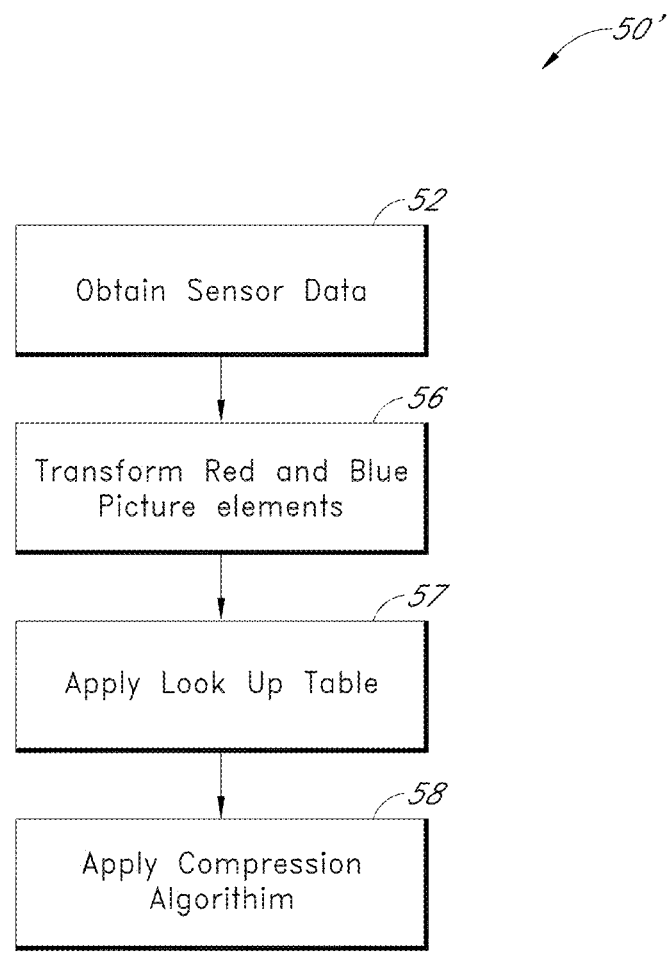
FIG. 8A is a flowchart illustrating a modification of the image data transformation technique of FIG. 8 that can also be used with the system illustrated in FIG. 1, according to various embodiments.

FIG. 8A illustrates a modification of the flowchart 50, identified by the reference numeral 50'. Some of the steps described above with reference to the flowchart 50 can be similar or the same as some of the corresponding steps of the flowchart 50' and thus are identified with the same reference numerals.

Figure 11:
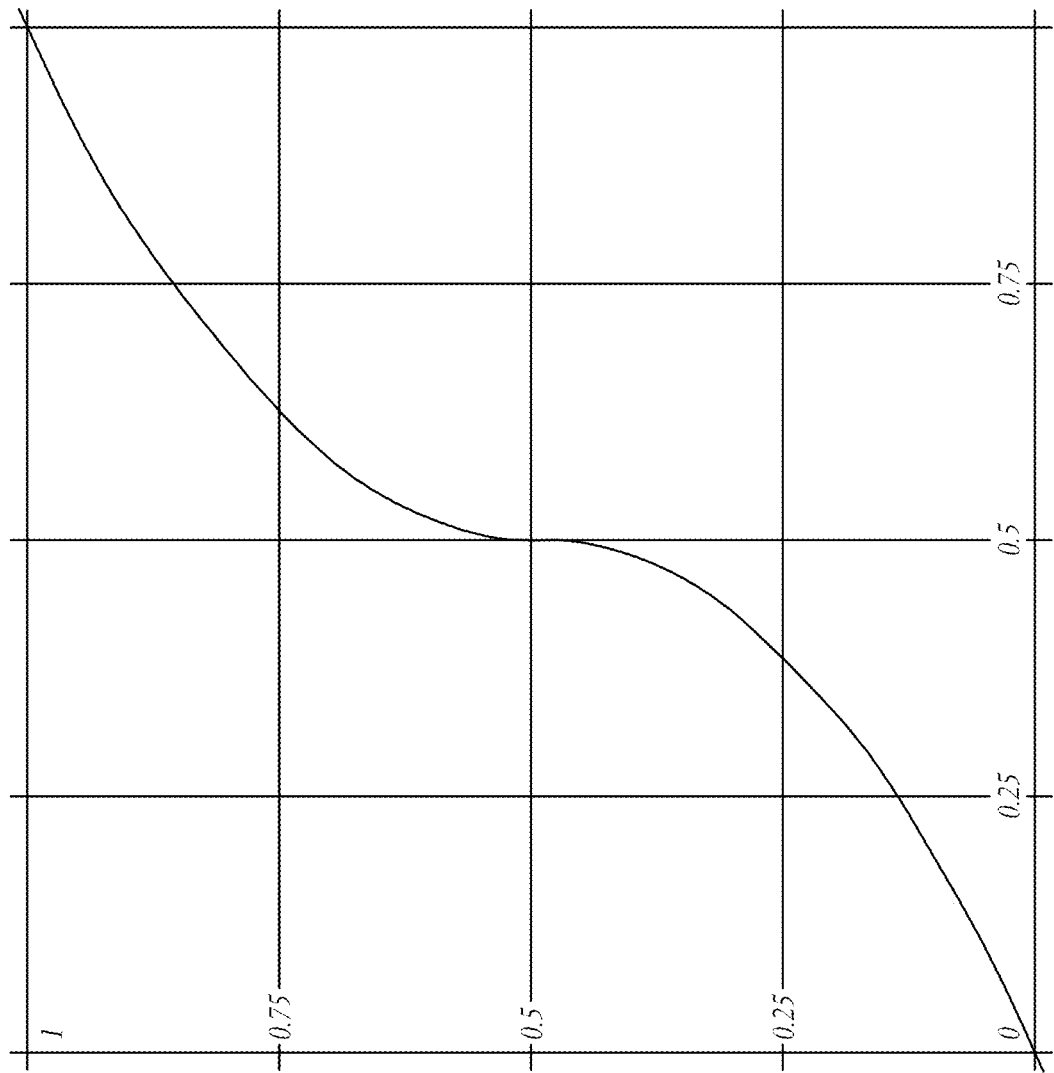
FIG. 11 illustrates an exemplary optional transform that can be applied to the image data for gamma correction, according to various embodiments.

As shown in FIG. 8A, the flowchart 50', in some embodiments, can optionally omit operation block 54. In some embodiments, the flowchart 50' can also include an operation block 57 in which a look up table can be applied to the image data. For example, an optional look-up table, represented by the curve of FIG. 11, can be used to enhance further compression. In some embodiments, the look-up table of FIG. 11 is only used for the green picture elements. In other embodiments, the look-up table can also be used for red and blue picture elements. The same look-up table may be used for the three different colors, or each color may have its own look-up table. Additionally, processes other than that represented by the curve of FIG. 11 can also be applied.

Additionally, as described above with respect to FIG. 8, an additional denoising operation may be included in the flowchart 50' of FIG. 8A. Examples of various denoising and noise reduction techniques may be found in the '821 application and the '830 patent incorporated by reference herein in their entirety.

By processing the image data in the manner described above with reference to FIGS. 8 and 8A, it has been discovered that the image data from the image sensor 18 can be compressed into compressed raw image data by a compression ratio of 6 to 1 or greater and remain visually lossless. Additionally, although the image data has been transformed (e.g., by the subtraction of green image data), the transformation is reversible. Moreover, the compressed image data according to certain implementations is still raw. For example, the compressed raw data can be decompressed and gamma processed, color corrected, tonally processed and/or demosaiced using any process the user desires.

Figure 12:
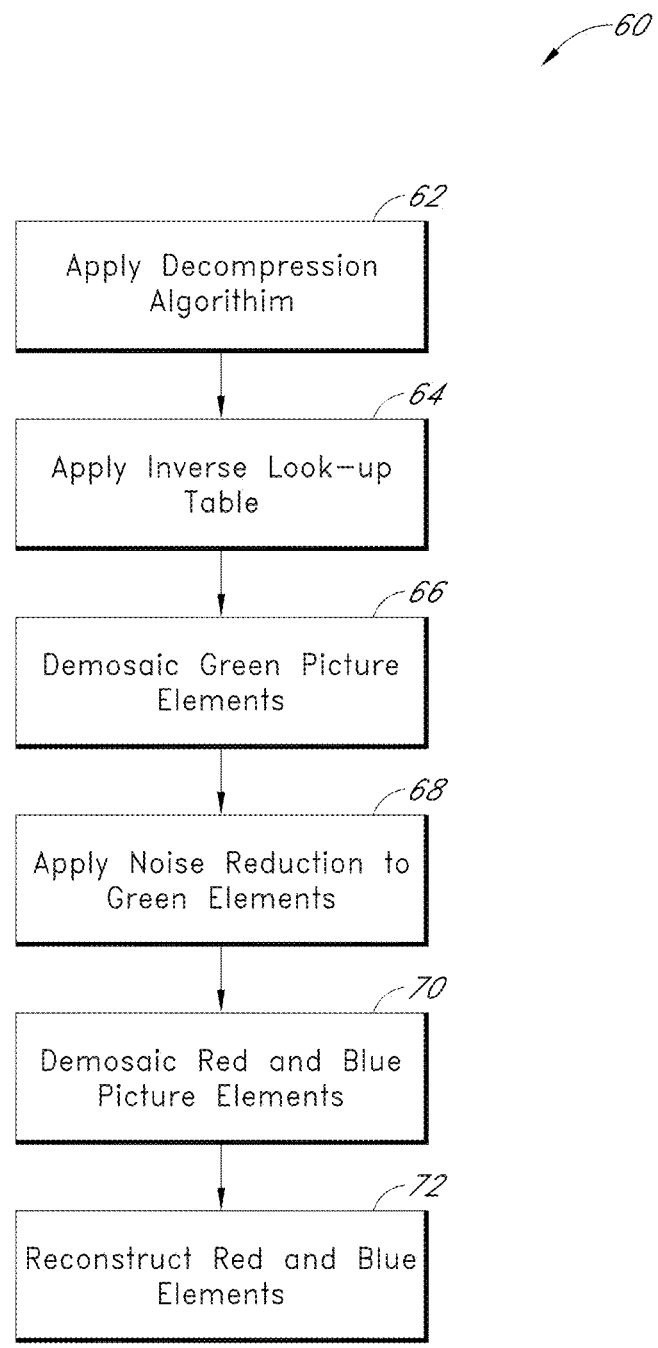
FIG. 12 is a flowchart of a control routine that can be used with the system of FIG. 1 to decompress and demosaic image data, according to various embodiments.

For example, with reference to FIG. 12, the data stored in the storage device 24 can be decompressed and demosaiced. Optionally, the camera 10 can be configured to perform the method illustrated by flowchart 60. For example, but without limitation, the playback module 28 can be configured to perform the method illustrated by flowchart 60. However, a user can also transfer the data from the storage device 24 into a separate workstation and apply any or all of the steps and/or operations of the flowchart 60.

With continued reference to FIG. 12, the flowchart 60 can begin with the operation block 62, in which the data from the storage device 24 is decompressed. For example, the decompression of the data in operation block 62 can be the reverse of the compression algorithm performed in operational block 58 (FIG. 8). After the operation block 62, the flowchart 60 can move on to an operation block 64.

In the operation block 64, a process performed in operation block 56 (FIG. 8) can be reversed. For example, the inverse of the curve of FIG. 11 or the inverse of any of the other functions described above with reference to operation block 56 of FIGS. 8 and 8A, can be applied to the image data. After the operation block 64, the flowchart 60 can move on to a step 66.

In the operation block 66, the green picture elements can be demosaiced. For example, as noted above, all the values from the data components Green 1 and/or Green 2 (FIG. 7) can be stored in the storage device 24. For example, with reference to FIG. 5, the green image data from the data components Green 1, Green 2 can be arranged according to the original Bayer pattern applied by the image sensor 18. The green data can then be further demosaiced by any known technique, such as, for example, linear interpolation, bilinear, etc.

FIG. 13 illustrates an exemplary layout of green image data demosaiced from all of the raw green image data. The green image elements identified with the letter $G_x$ represent original raw (decompressed) image data and the elements identified with "$DG_x$" represent elements that were derived from the original data through the demosaic process. This nomenclature is used with regard to the below descriptions of the demosaicing process for the other colors. FIG. 14 illustrates an exemplary image data layout for green image data demosaiced from ½ of the original green image data.

With continued reference to FIG. 12, the flowchart 60 can, after the operation block 66, move on to an operation block 68. In the operation block 68, the demosaiced green image data can be further processed. For example, but without limitation, noise reduction techniques can be applied to the green image data. As described above with respect to FIG. 8, examples of various denoising and noise reduction techniques may be found in the '821 application and the '830 patent incorporated by reference herein in their entirety. However, any other image processing technique, such as anti-aliasing techniques, can also be applied to the green image data. After the operation block 68, the flowchart 60 can move on to an operation block 70.

In the operation block 70, the red and blue image data can be demosaiced. For example, firstly, the blue image data of FIG. 9 can be rearranged according to the original Bayer pattern (FIG. 15). The surrounding elements, as shown in FIG. 16, can be demosaiced from the existing blue image data using any known demosaicing technique, including linear interpolation, bilinear, etc. As a result of demosaicing step, there will be blue image data for every pixel as shown in FIG. 16. However, this blue image data was demosaiced based on the modified blue image data of FIG. 9, i.e., blue image data values from which green image data values were subtracted.

The operation block 70 can also include a demosaicing process of the red image data. For example, the red image data from FIG. 10 can be rearranged according to the original Bayer pattern and further demosaiced by any known demosaicing process such as linear interpolation, bilinear, etc.

After the operation block 70, the flowchart can move on to an operation block 72. In the operation block 72, the demosaiced red and blue image data can be reconstructed from the demosaiced green image data.

In some embodiments, each of the red and blue image data elements can be reconstructed by adding in the green value from co-sited green image element (the green image element in the same column "m" and row "n" position). For example, after demosaicing, the blue image data includes a blue element value $DB_{m-2,n-2}$. Because the original Bayer pattern of FIG. 3 did not include a blue element at this position, this blue value $DB_{m-2,n-2}$ was derived through the demosaicing process noted above, based on, for example, blue values from any one of the elements $B_{m-3,n-3}$, $B_{m-1,n-3}$, $B_{m-3,n-1}$, and $B_{m-1,n-1}$ or by any other technique or other blue image elements. As noted above, these values were modified in operation block 54 (FIG. 8) and thus do not correspond to the original blue image data detected by the image sensor 18. Rather, an average green value had been subtracted from each of these values. Thus, the resulting blue image data $DB_{m-2,n-2}$ also represents blue data from which green image data has been subtracted. Thus, in one embodiment, the demosaiced green image data for element $DG_{m-2,n-2}$ can be added to the blue image value $DB_{m-2,n-2}$ thereby resulting in a reconstructed blue image data value.

In some embodiments, optionally, the blue and/or red image data can first be reconstructed before demosaicing. For example, the transformed blue image data $B'_{m-1,n-1}$ can be first reconstructed by adding the average value of the surrounding green elements. This would result in obtaining or recalculating the original blue image data $B_{m-1,n-1}$. This process can be performed on all of the blue image data. Subsequently, the blue image data can be further demosaiced by any known demosaicing technique. The red image data can also be processed in the same or similar manners.

Figure 12A:
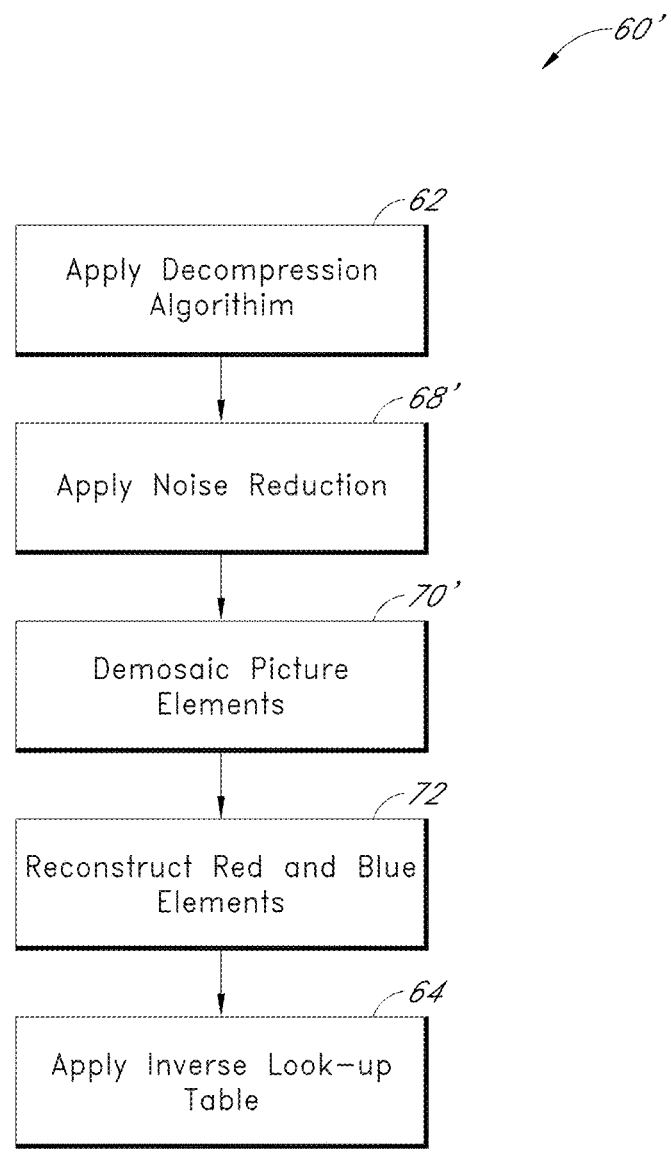
FIG. 12A is a flowchart illustrating a modification of the control routine of FIG. 12 that can also be used with the system illustrated in FIG. 1, according to various embodiments.

FIG. 12A illustrates a modification of the flowchart 60, identified by the reference numeral 60'. Some of the steps described above with reference to the flowchart 60 can be similar or the same as some of the corresponding steps of the flowchart 60' and thus are identified with the same reference numerals.

As shown in FIG. 12A, the flow chart 60' can include the operation block 68' following operation block 62. In operation block 68', a noise reduction technique can be performed on the image data. For example, but without limitation, noise reduction techniques can be applied to the green image data. As described above with respect to FIG. 8, examples of various denoising and noise reduction techniques may be found in the '821 application and the '830 patent incorporated by reference herein in their entirety. However, any other image processing technique, such as anti-aliasing techniques, can also be applied to the green image data. After operation block 68', the flow chart can move on to operation block 70'

In operation block 70', the image data can be demosaiced. In the description set forth above with reference to operation blocks 66 and 70, the green, red, and blue image data can be demosacied in two steps. However, in the present flow chart 60', the demosaicing of all three colors of image data is represented in a single step, although the same demosaicing techniques described above can be used for this demosaicing process. After the operation block 70', the flow chart can move on to operation block 72, in which the red and blue image data can be reconstructed, and operation block 64 in which an inverse look-up table can be applied.

After the image data has been decompressed and processed according to either of the flow charts 70 or 70', or any other suitable process, the image data can be further processed as demosaiced image data.

By demosaicing the green image data before reconstructing the red and blue image data, certain further advantages can be achieved. For example, as noted above, the human eye is more sensitive to green light. Demosaicing and processing the green image data optimize the green image values, to which the human eye is more sensitive. Thus, the subsequent reconstruction of the red and blue image data will be affected by the processing of the green image data.

Additionally, Bayer patterns have twice as many green elements as red and blue elements. Thus, in embodiments where all of the green data is retained, there is twice as much image data for the green elements as compared to either the red or blue image data elements. Thus, the demosaicing techniques, filters, and other image processing techniques result in a better demosaiced, sharpened, or otherwise filtered image. Using these demosaiced values to reconstruct and demosaic the red and blue image data transfers the benefits associated with the higher resolution of the original green data to the process, reconstruction, and demosaicing of the red and blue elements. As such, the resulting image is further enhanced.

Further, as described above, green channel data may be subtracted from each of the blue and red channels to improve compressibility of the image data with little or no visual loss. According to various embodiments, this advantageous improved compressibility is possible, at least in part, because the color and/or intensity of the red and blue channels are correlated with the color and/or intensity of green channels. Accordingly, subtracting green channel data from red and/or blue channel data may de-correlate a portion of the color and/or intensity data, improving compressibility.

Green Average Subtraction

Referring again to FIGS. 1 and 4, the image processing module 20 can be configured to modify image data based on green image data, such as by modifying Green 2 image data based on Green 1 image data or vice versa, and/or modifying Red and Blue image data based on Green image data. For instance, the image processing module 20 could be configured to compute an average green value from a neighborhood, or "kernel," of Green pixels. For example, in various embodiments the image processing module 20 may determine multiple Green pixels located near, or adjacent to, a current pixel of interest (also referred to as a target pixel). These determined Green pixels may be referred to as the kernel of Green pixels. Green pixels adjacent to a target pixel (for example, the kernel associated with the target pixel) may include Green pixels located above or below, beside, and/or diagonal to, the target pixel. For example, the Green pixels adjacent to the target pixel may include some or all of the Green pixels that are physically nearest to the target pixel.

In some cases, the calculated green value is spatially co-located or spatially correlated with the target pixel. For instance, values for at least two pixels opposing one another with respect to the target pixel may be averaged or combined using some other appropriate type of algorithm to generate the calculated green value. For instance, at least two pixels may include pixels diagonally opposing one another with respect to the target pixel, pixels above and below the target pixel, pixels to the left and right of the target pixel, or a combination thereof.

In various implementations, Green pixels located a further distance from the target pixel may be used to generate the calculated green value (e.g., calculate an average green value). The calculated green value may be used to perform GAS (Green Average Subtraction), in which the average green value calculated with respect to a target pixel may be subtracted from the target pixel. For example, in GAS, average green values may be subtracted from pixels in the Red/Blue data path and/or one of the Green data paths.

For example, the image processing module 20 may compute a 4-pixel average of a kernel of pixels (e.g., defect corrected and noise reduced pixels) which may include an average Green value relative to any particular pixel (e.g., a target pixel). Neighboring Green pixels (or a kernel of Green pixels) to be averaged may be selected based on whether an even row is being processed or an odd row is being processed, as well as whether a Red, Blue, or Green pixel is a target pixel. For example, referring again to FIG. 3, when the target pixel is the Red pixel $R_{m,n}$, the four neighboring pixels may include $G_{m,n-1}$, $G_{m+1,n}$, $G_{m,n+1}$, and $G_{m-1,n}$. Similarly, when the target pixel is Blue pixel $B_{m-1,n-1}$, the four neighboring pixels may include $G_{m-1,n-2}$, $G_{m,n-1}$, $G_{m-1,n}$, and $G_{m-2,n-1}$. In each of these examples, when the target pixel is a Red or Blue pixel, the four neighboring pixels may include Green pixels immediately adjacent to the target pixel, for example, the pixels above and below and immediately on either side of the Red/Blue pixel.

Referring to FIG. 17, an example of neighboring, or kernel, pixel selection is shown with respect to a Green target pixel, according to various embodiments. As shown, and as described above, each alternating row of image data may include Green1 channel or Green2 channel image data/pixels. As mentioned above, in various embodiments it may be advantageous to subtract or otherwise modify Green2 data based on Green1 data (or vice versa, depending on the embodiment), for example, to perform GAS on Green 2 data. For instance, in some embodiments an average of a kernel of Green1 data may be subtracted from Green2 data (or vice versa), as is described further below. As one example, the image processing module 20 can be configured to compute a 4-pixel average of defect corrected and noise reduced pixels of Green1 data for a given pixel of Green2 data. In various embodiments, depending on a sensor configuration, average green values may be calculated based on green data on even rows or green data on odd rows. In the case of Bayer pattern image data or other appropriate mosaic image data, the 4 neighboring pixels can be selected for one of the two green channels. In one embodiment, a register can select whether Greens on the Red line (e.g., even line) will be used as a reference or if Green on a Blue row (e.g., odd line) will be used as a reference. By subtracting the kernel of Green 1 values from the current Green 2 value, and encoding the residual, the Green 1 channel is effectively used as a predictor of the Green 2 channel.

In an embodiment, when the target pixel is Green 2 pixel $G_{m-1,n}$ (labeled 180), the four neighboring Green 1 pixels may include $G_{m-2,n-1}$, $G_{m,n-1}$, $G_{m,n+1}$, and $G_{m-2,n+1}$ (labeled 181, 182, 183, and 184 respectively). In this example, it may be seen that, for Bayer pattern image data, when the target pixel is a Green pixel, the four closest neighboring pixels may be used as a kernel and may include Green pixels of the other channel (for example, Green 1 channel vs. Green 2 channel) immediately diagonally adjacent (for example, immediately adjacent, diagonally adjacent, spatially adjacent) to the target pixel, for example, the pixels diagonally opposite the Green target pixel. In one embodiment, only two of the diagonally adjacent Green pixels are used as a kernel (e.g., pixel 181 and pixel 183, pixel 184 and pixel 182). In both cases (i.e., where two diagonally opposing adjacent pixels are used or where all four diagonally adjacent pixels are used), there is some degree of spatial colocation and spatial correlation between the pixels used in the calculation and the target pixel, resulting in better results, e.g., results suitable for cinema applications. This can reduce or eliminate the occurrence of edge exaggeration on color boundaries or other undesirable artifacts, which may occur where only a single Green pixel is used in the calculation, or where only pixels on one side of the Green pixel are employed in the calculation, such as an embodiment where only pixel 181 and pixel 184 are used, or only pixels 182 and 183 are employed. In some alternative embodiments, only a single Green pixel is used in the calculation, or only pixels from one side of the target pixel are used.

In various embodiments, and as mentioned above, an average green value (or green value calculated according to some other appropriate algorithm) may be computed based on a kernel of Green pixels located a further distance from the target pixel. Referring again to FIG. 17, for the target Green 2 pixel 180 and as described above, selecting a kernel of Green 1 pixels located a first distance away from Green 2 pixel 180 may include all Green 1 pixels contained within a first conceptual square box surrounding Green 2 pixel 180 and having an edge length of three pixels. This first conceptual square box includes Green 1 pixels $G_{m-2,n-1}$, $G_{m,n-1}$, $G_{m,n+1}$, and $G_{m-2,n+1}$ (labeled 181, 182, 183, and 184 respectively). Similarly, selecting a kernel of Green 1 pixels located a second, further distance away from Green 2 pixel 180 may include all Green 1 pixels contained within a second, larger conceptual square box surrounding Green 2 pixel 180 having an edge length of seven pixels. This second conceptual square box includes, in addition to the Green 1 pixels in the first conceptual box, Green 1 pixels $G_{m-2,n-3}$, $G_{m,n-3}$, $G_{m+2,n-3}$, $G_{m+2,n-1}$, $G_{m+2,n+1}$, $G_{m+2,n+3}$, $G_{m,n+3}$, $G_{m-2,n+3}$, and four additional Green 1 pixels not shown (but that would be present in a column m−4 if shown). This second conceptual box is the next largest square box surrounding the target Green 2 pixel that includes additional Green 1 pixels. In various embodiments, similar to the description above, any combination of Green 1 pixels in the second conceptual box surrounding the target Green 2 pixel may be selected as a kernel. For example, in an embodiment Green 1 pixels located along one or both diagonals from the target pixel may be used as a kernel. As described above, an average green value of the selected kernel of Green 1 pixels neighboring the target Green 2 pixel (or vice versa) may be computed. This value may be subtracted from the value of the target Green 2 pixel to determine a residual, and the residual may be encoded. Accordingly, the Green 1 channel may effectively be used as a predictor of the Green 2 channel.

Similarly, in various embodiments an average green value with respect to a Red and/or Blue target pixel may be computed based on neighboring Green pixels located a further distance from the target pixel (rather than, or in addition to, the Green pixels immediately adjacent to the target pixel). For example, referring again to FIG. 3, when the target pixel is the Red pixel $R_{m,n}$, an average green value may be computed based on, for example, any combination of Green pixels $G_{m+1,n-2}$, $G_{m+2,n-1}$, $G_{m+2,n+1}$, $G_{m+1,n+2}$, $G_{m-1,n+2}$, $G_{m-2,n+1}$, $G_{m-2,n-1}$, and/or $G_{m-1,n-2}$, either alone or in addition to the Green pixels mentioned above. In some cases, additional Green pixels further from the target pixel may be also be used (e.g., $G_{m+3,n}$, $G_{m-3,n}$, $G_{m,n-3}$, $G_{m,n+3}$). Similarly, when the target pixel is the Blue pixel $B_{m-1,n-1}$, an average green value may be computed based on, for example, any combination of Green pixels $G_{m,n-3}$, $G_{m+1,n-2}$, $G_{m+1,n}$, $G_{m,n+1}$, $G_{m-2,n+1}$, $G_{m-3,n}$, $G_{m-3,n-2}$, and/or $G_{m-2,n-3}$, either alone or in addition to the Green pixels mentioned above. In some cases, additional Green pixels further from the target pixel may be also be used.

In various embodiments, once neighboring Green pixels are determined for any particular target pixel, an average green value may be determined for that target pixel as described above with referenced to FIGS. 9 and 10 (among others). For example, an average value of the neighboring pixels may be computed and then subtracted from the value of the target pixel. The process of determining an average green value for neighboring pixels and subtracting that average value from a target pixel may be referred to as Green Average Subtraction (GAS).

Figure 18:
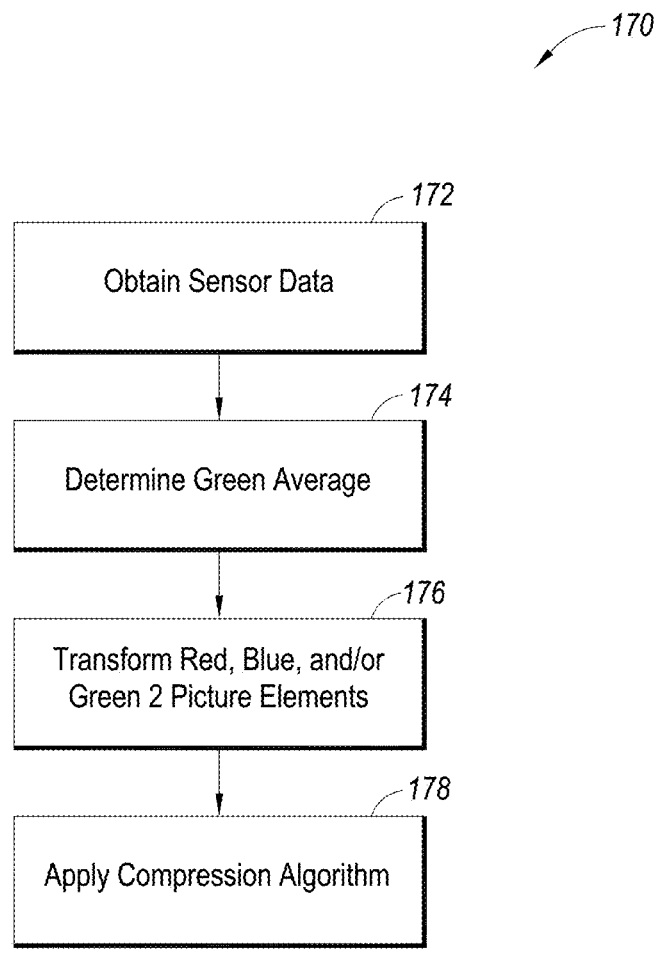
FIG. 18 is a flowchart illustrating an image data transformation technique involving the modification of green image data that can be used with the system illustrated in FIG. 1, according to various embodiments.

As mentioned above, in various embodiments, green data modification (e.g., GAS) may be performed on both Red/Blue data and on Green2 (or Green 1) data. FIG. 18 shows a flowchart 170 illustrating an image data transformation technique that may be used with the system illustrated in FIG. 1, according to various embodiments. Flowchart 170 may represent a control routine stored in a memory device, such as the storage device 24, or another storage device within the camera 10. Additionally, a central processing unit (CPU) may be configured to execute the control routine. The flowchart 170 may include more or fewer blocks, and/or the blocks may be arranged in a different order than shown in FIG. 18. Certain aspects of the flowchart 170 may be similar to the flowcharts 50 and 50' of FIGS. 8 and 8A described above. Accordingly, certain details regarding flowchart 170 may be found above in the description above with respect to FIGS. 8 and 8A, where applicable. For instance, while not shown in FIG. 18, the image processor 20 may pre-emphasize the data in the manner described above. The pre-emphasis occurs before the transformation of the red, blue, and/or Green 2 picture elements at block 176 and/or the determination of the green average at block 174 in some embodiments. In some other implementations, the pre-emphasis occurs after the operations at blocks 174 and 176, but before application of the compression algorithm at block 178.

Referring to FIG. 18, at block 172 sensor data may be obtained by the camera 10. At block 174, green values for use in green data modification (e.g., average green values) may be determined and/or computed for the Red, Blue, and/or Green2 pixels as described above. The calculated green values may be computed based on Green1 data and/or Green1 and Green2 data. For example, in an embodiment, GAS with respect to the Red/Blue pixels may be based on both Green1 and Green2 pixels, as described above. Further, GAS with respect to Green2 pixels may be based on Green1 pixels. Alternatively, in an embodiment, GAS with respect to Red/Blue pixels may be based on a single green channel, for example, Green1. In various embodiments, green channel data may be denoised and/or demosaiced before and or after GAS, as described herein.

At block 176, Red, Blue, and/or Green2 pixels may be transformed as described above. Specifically, in an embodiment respective computed average green values may be subtracted from Red, Blue, and/or Green2 pixel values. In various embodiments Red/Blue or Green2 pixels may be transformed first. For example, in an embodiment Red/Blue pixels are first transformed via GAS based on Green1 and Green2 pixel values, according to any of the methods described above. Then Green2 pixel values may be transformed via GAS based on Green1 pixel values. In another embodiment, Green1 pixel values may be used to transform Red/Blue and Green2 pixel values in any order and/or simultaneously. In an embodiment, Green1 pixel values, or any combination of Green1 and Green2 pixel values (for example, demosaiced green pixel values) may be used to transform Red/Blue pixels. At block 178, Red, Blue, and/or Green channels of data, GAS having been implemented, may be compressed, as described above. Although the image data has been transformed (e.g., by the subtraction of green image data), the transformation is reversible. Moreover, the compressed image data according to certain embodiments is compressed raw image data. For example, the compressed raw data is mosaiced. Moreover, in various implementations, the compressed raw data can be decompressed and then gamma processed, color corrected, tonally processed and/or demosaiced using any process the user desires.

In an embodiment, GAS may be performed with respect to Green1 data/pixels, rather than with respect to Green2 data/pixels (as described above). In an embodiment, the camera 10 may support GAS performed with respect to either Green1 data and/or Green2 data. In various embodiments, other blocks may be included in flowchart 170. For example, as indicated, flowchart 170 may include a data block in which the image data is pre-emphasized (for example, similar to block 54 of FIG. 8), and/or in which a look up table is applied (for example, similar to block 57 of FIG. 8A), among implementing other functions.

As described above, GAS with respect to a green channel, in addition to Red/Blue channels, may further improve compressibility of the image data with little or no visual loss. In various embodiments, this further improved compressibility is advantageously possible, at least in part, because the first green channel can be used to predict a second green channel and the first and second green channels may be spatially correlated with one another. Accordingly, in an embodiment, subtracting the first green channel data from the second green channel data may at least partially spatially de-correlate the green image data (further reducing entropy and improving compressibility) and the difference, or residual, may be encoded.

GAS at Bayer Borders

Figure 19:
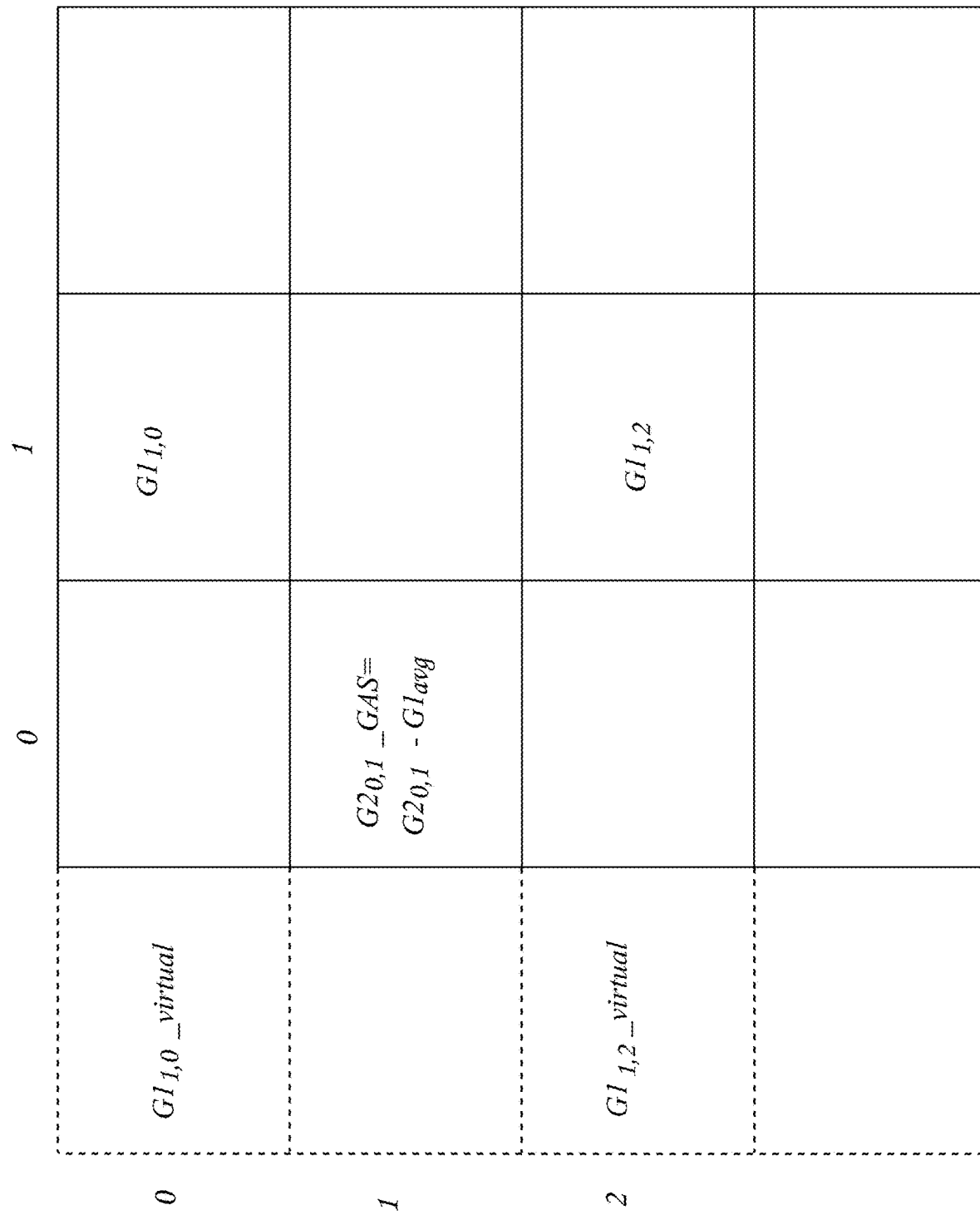
FIG. 19 is an example of an application of an image transformation process including neighboring pixel selection, for image data at an edge of an image, according to various embodiments.

In various embodiments, GAS may be performed for pixels that lie at various edges of mosaiced image data, such as image data that is mosaiced according to a Bayer pattern color filter array. FIG. 19 shows an example of determining neighboring pixels for a green pixel at an edge of the Bayer pattern. In FIG. 19, the Green2 pixel $G2_{0,1}$ exists in the first column of the Bayer pattern, and accordingly no other Green pixels exist to the left of pixel $G2_{0,1}$ (for example, the pixels in dashed lines may be virtual pixels). Determining neighboring pixels with respect to pixel $G2_{0,1}$ may be performed in various ways. For example, in one embodiment GAS (or other green data modification) may be performed based on the values of the two neighboring pixels $G1_{1,0}$ and $G1_{1,2}$. In another embodiment that may be advantageous for ease of implementation in the camera, each of pixels $G1_{1,0}$ and $G1_{1,2}$ may be virtually mirrored, as shown in FIG. 19 with pixels $G1_{1,0}$_virtual and $G1_{1,2}$_virtual (shown in dashed lines). In this embodiment GAS may be performed based on the values of the pixels $G1_{1,0}$, $G1_{1,2}$, $G1_{1,0}$_virtual, and $G1_{1,2}$_virtual. Virtually mirroring of pixels may be implemented in hardware devices and/or software instructions executed by a hardware processor.

Mirroring of pixel values for calculations of average green values at the edges of the Bayer pattern may similarly, in various embodiments, be implemented for Red/Blue pixels and for pixels in a first row, last row, first column, and/or last column. For example, referring to Table 1 below:

When processing a first Bayer row, then Green1_01 may be copied/mirrored for Green1_00 and Green1_11 for Green1_10.

When processing a last Bayer row, then Green1_00 may be copied/mirrored for Green1_01 and Green1_10 for Green1_11.

When processing a first Bayer column, then Green1_10 may be copied/mirrored for Green1_00 and Green1_11 for Green1_01.

When processing a last Bayer column, then Green1_00 may be copied/mirrored for Green1_10 and Green1_01 for Green1_11.

TABLE 1

| Green1_00 | Green2 | Green1_10 |
|---|---|---|
| Green1_01 | | Green1_11 |

Green Average Subtraction may be applied on the Red/Blue data path and/or Green2 data after a Pre-Emphasis function is applied to the image data in some embodiments (e.g., after block 54 of FIG. 8). In some embodiments, following GAS, Green channel data and the Red/Blue channel data may be synchronized since the average green value from the Green data path is used to perform Green Average Subtraction in the Red/Blue Data path.

GAS Calculation

In an embodiment, image data may captured, processed, and stored with 16-bit precision. For example, image sensor 18 and image processing module 20 (shown in FIG. 1) may capture and process 16-bit image data. In various embodiments, the image sensor 18 and image processing module 20 may capture and process image data suitable for cinema applications, such as at least 12-bit, 13-bit, 14-bit, 15-bit, or 16-bit image data, or higher, although lower bit-depths can be employed in some cases (e.g., at least 10-bit or at least 11-bit image data). 16-bit precision allows capture and storage of image data in which red, blue, and green data (for example, color intensity data for each pixel) may range on a scale from 0-65,535. Accordingly, Green Average Subtraction on the Red/Blue and Green2 data paths may be implemented by first performing an average calculation on neighboring green pixels (as described above) to determine a GreenAverage. For example, a Green1 Average calculation may be defined as (Green1_00+Green1_01+Green1_10+Green1_11)>>2, where ">>2" indicates a left shift by two operation (causing a division by 4). Then a subtraction calculation may be implemented to subtract the average value from the target pixel value. In an embodiment, following the subtraction calculation the resulting value may be left shifted by one bit (to implement a divide by 2 operation), as follows:

RedBlue_GAS[15:0]=(RedBlue[15:0]−GreenAverage [15:0]+2^16)/2; and

Green2_GAS[15:0]=(Green2[15:0]−Green1Average [15:0]+2^16)/2

In an embodiment, division by 2 in the RedBlue_GAS and Green2_GAS operations may bring the GAS data into the same dynamic range as the unmodified Green data (for example, Green1 data). The division operation may be implemented as a logical shift by one bit and, in particular implementations a one-half-bit loss of precision may be incurred during this step. In an embodiment, a one-half-bit loss of precision may advantageously enable for faster processing of image data and reduced bandwidth requirements. However, in some embodiments the GAS calculation me be implemented such that there is no loss of precision. For example, an extra buffering bit may be added in the processing pipeline to represent the RedBlue_GAS and Green2_GAS, and/or the RedBlue_GAS and Green2_GAS may not be divided by 2.

In some embodiments, the RedBlue_GAS value and/or the Green2_GAS value may be calculated using one of the techniques described above, e.g., the techniques described with respect to block 56 of FIGS. 8 and 8A and as shown and described with respect to FIGS. 9 and 10.

Figure 20:
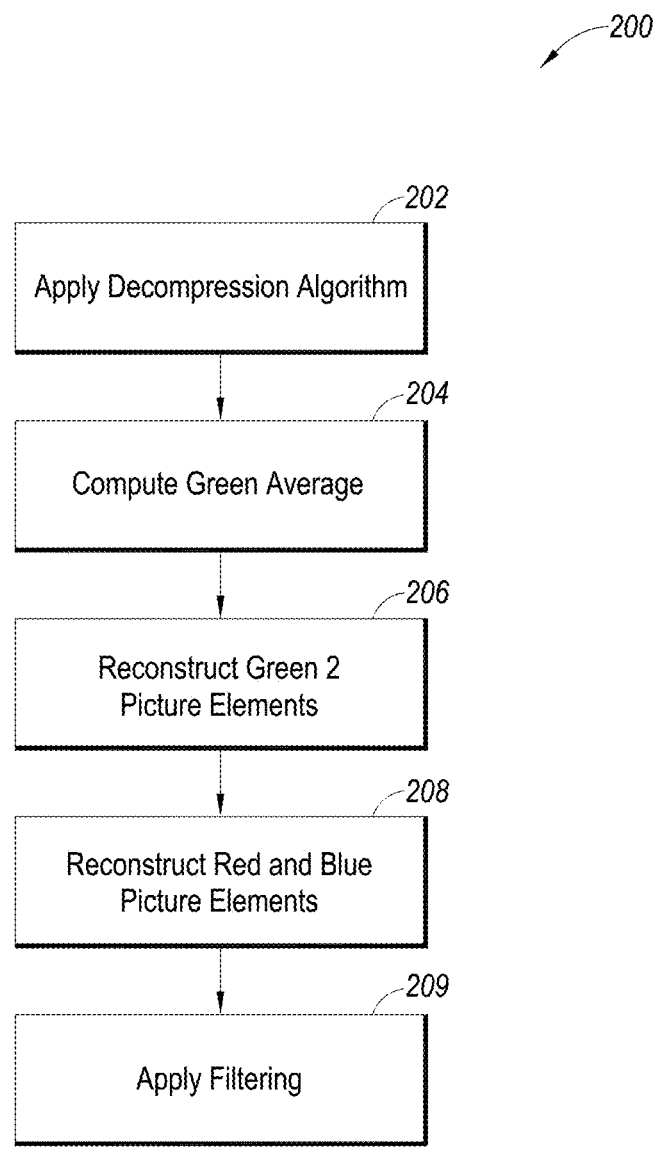
FIG. 20 is a flowchart of a control routine that can be used with the system of FIG. 1 to decompress and reconstruct image data, according to various embodiments.

In various embodiments, inverse green data modification, which in the case of Green Average Subtraction, is referred to herein as De-GAS, may be used to reverse the effect of the green data modification transform that was performed upstream in the Sensor Data Path. FIG. 20 shows a flowchart 200 of a control routine that may be used with the system of FIG. 1 to De-GAS image data, according to various embodiments. Flowchart 200 may represent a control routine stored in a memory device, such as the storage device 24, or another storage device within the camera 10. Additionally, a central processing unit (CPU) may be configured to execute the control routine. The flowchart 200 may include more or fewer blocks, and/or the blocks may be arranged in a different order than shown in FIG. 20. Certain aspects of the flowchart 200 may be similar to the flowcharts 60 and 60' of FIGS. 12 and 12A described above. Accordingly, certain details regarding flowchart 200 may be found above in the description above with respect to FIGS. 12 and 12A, where applicable.

At block 202, a decompression algorithm may be applied to the compressed and GASed image data (for example, similar to block 62 for flowchart 60). At block 204 average green values may be calculated based on, for example, the Green1 and/or Green2 image data. For example, in an embodiment in which GAS has not been applied to the Green1 image data, Green1 pixels neighboring the Green2 pixels may be determined and averages may be calculated, as described above. At block 206, Green2 pixels may be reconstructed based on the calculated Green1 average values. For example, the Green1 average values may be added back into the Green2 pixel data. At block 208, Red/Blue pixels may be reconstructed based on the calculated Green1 average values and/or calculated Green1 and Green2 average values. At block 209, the reconstructed image data may be filtered and/or denoised (as described above).

In various embodiments, additional blocks may be included in flowchart 200. For example, Green1 and/or Green1 and Green2 image data may be demosaiced, and/or Red/Blue image data may be demosaiced prior to reconstruction of the Red, Blue, and/or Green image data. In another example, filtering and/or denoising may be applied to the image data at any point in the flowchart 200 (for example, as is shown in flowcharts of FIGS. 12 and 12A).

Figure 21:
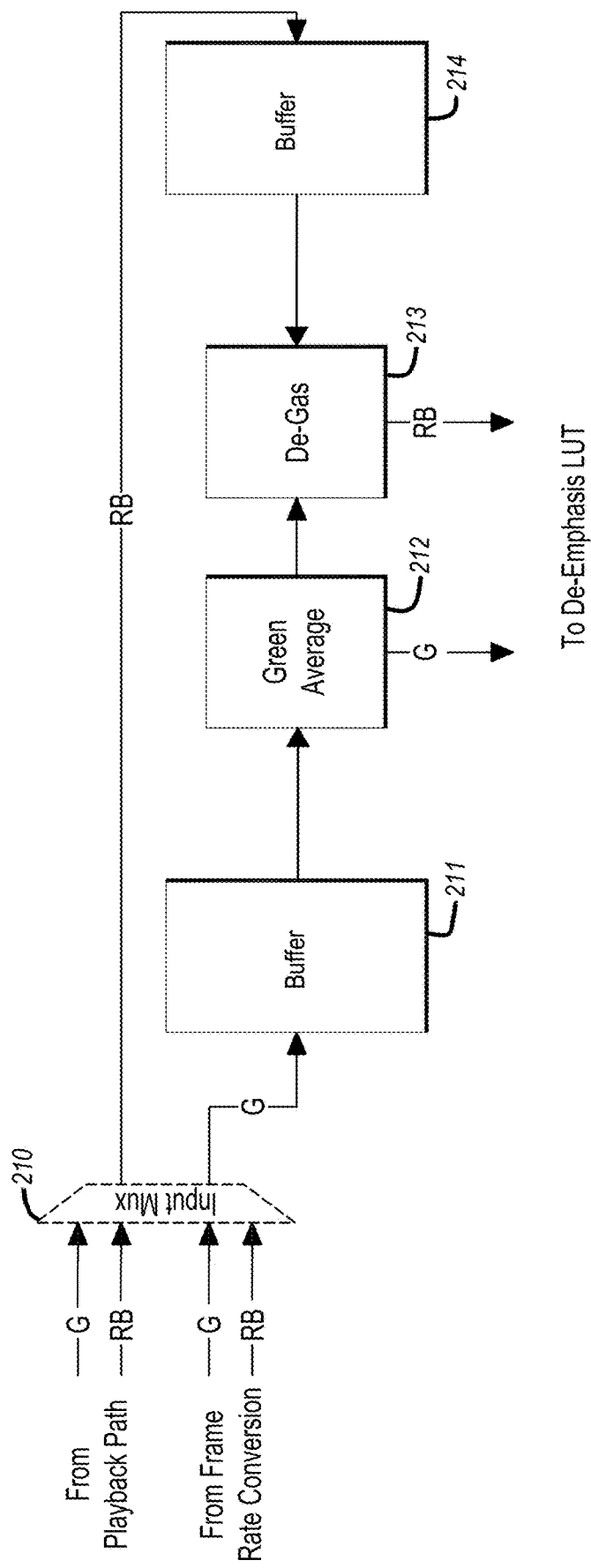
FIG. 21 illustrates an example subsystem for reversing an image data transformation technique according to certain embodiments, according to various embodiments.

An example subsystem for reversing the GAS process is shown in FIG. 21. The subsystem of FIG. 21 may reside on the camera (e.g., in the playback module 26) or in software (and/or hardware) executing in a separate computing device, depending on the implementation. As shown in FIG. 21, the subsystem may receive, at an Input Mux 210, input either from the Sensor Data Path (shown as "From Frame Rate Conversion," for example, during capture mode, e.g., as part of a monitoring function for live viewing of captured image data) and/or from the Playback Path (for example, during playback mode). Green Average Subtraction may be reversed, or the image data may be De-GASED, by adding the Green Average back into the Red and Blue pixels in the case of RedBlue_DeGAS, and adding Green1 Average back into the Green2 pixels in the case of Green2_DeGAS. In an embodiment, the De-GAS process may be similar to Green Average Subtraction except that the green average values may be added to, instead of subtracted from, image pixel data. For example, green image data may be passed to Buffer 211 and then to Green Average calculation unit 212. The Green Average calculation unit 212 may output a green average based on the Green1 values and/or the Green2 values, as described above, to a De-GAS calculation unit 213. Further, the red/blue image data may be passed to Buffer 214 and then to the De-GAS calculation unit 213. The De-GAS calculation unit 213 may calculate and output reconstructed values for the Red/Blue image data, while the Green Average calculation unit 212 may output reconstructed values for Green image data.

In an embodiment, arithmetic equation for De-GAS are as follows:

RedBlue_DeGAS[16:0]=RedBlue_GAS[16:0]*2+ GreenAverage[16:0]−2^16;

and

Green2_DeGAS[16:0]=Green2_GAS[16:0]*2+ Green1Average[16:0]−2^16

In various embodiments, the RAW path in the Record/Monitor Pre-Process may work on GAS data while a separate RGB path (not shown) may utilize non-GAS data for processing.

Sensor Flip

In some embodiments, the default Bayer pattern is when red pixels occupy the first line of frame. According to certain embodiments, the term sensor flip denotes when Bayer pattern is such that blue pixels occupy the first line of the frame. When this happens, the algorithm for GAS and De-GAS may change. For example, for a given red or blue pixel, the locations of the 4 neighbor green pixels may differ between the two bayer patterns, as described above.

According to various embodiments, additional software may not be needed to implement a sensor flip mode. The sensor flip may be automatically determined by using the register Bayer programming of the demosaic block. As such, no additional programming may be necessary.

Additional Embodiments

According to various embodiments, Green Average Subtraction, as implemented on the Red/Blue and Green channels described above, advantageously enables significant improvements in compressibility of the resulting image data with little or no loss of image information. For example, implementing GAS, as described above, on raw image data may enable processing, compression, and/or storage of the raw image data in a lossy manner (e.g., at compression ratios of at least 3, 4, 5, 6, 7, 8, 9, 10, 11, 12, 13, 14, 15, 16, 17, 18 to 1, or higher), but with little or no visual loss, where the image data is visually lossless or substantially visually lossless upon decompression and playback. In an embodiment, the systems and methods of green data modification (e.g., GAS) involving modification of green data, such as in addition to green data modification on the red and blue data may enable greater than a doubling of compression efficiency (as compared to lossless compression efficiency without GAS on green image channels).

Thus, in accordance with an embodiment, a video camera can comprise a portable housing, and a lens assembly supported by the housing and configured to focus light. A light sensitive device can be configured to convert the focused light into raw image data with a resolution of at least 2 k (or at least about 4 k depending on the embodiment), at a frame rate of at least about twenty-three frames per second. The camera can also include a memory device and an image processing system configured to compress and store in the memory device the compressed raw image data using lossy compression (e.g., at a compression ratio of at least 2:1, 3:1, 4:1, or 5:1) and remain substantially visually lossless, and at a rate of at least about 23 frames per second.

In accordance with yet another embodiment, a video camera can comprise a portable housing having at least one handle configured to allow a user to manipulate the orientation with respect to at least one degree of movement of the housing during a video recording operation of the camera. A lens assembly can comprise at least one lens supported by the housing and configured to focus light at a plane disposed inside the housing. A light sensitive device can be configured to convert the focused light into raw image data with a horizontal resolution of at least 2 k (or, in some embodiments, at least 4 k) and at a frame rate of at least about twenty three frames per second. A memory device can also be configured to store video image data. An image processing system can be configured to compress and store in the memory device the raw image data at a compression ratio of at least six to one and remain substantially visually lossless, and at a rate of at least about 23 frames per second.

Depending on the embodiment, certain acts, events, or functions of any of the algorithms, methods, or processes described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description.

What is claimed is:

1. A portable electronic device capable of capturing digital motion video, the portable electronic device comprising:

at least one memory device;

one or more image sensors configured to convert light incident on the one or more image sensors into mosaiced color motion video image data, the mosaiced color motion video image data comprising a plurality of color channels, the color channels comprising at least a first green color channel, a second green color channel, a red color channel, and a blue color channel; and one or more hardware processors configured to, for a plurality of motion video image frames:

for each respective green picture element of a plurality of green picture elements of the second green color channel, modify an initial value corresponding to the respective green picture element using a calculated value derived from values of a first kernel, the first kernel comprising a plurality of green picture elements of the first green color channel that are selected based on a position of the respective green picture element, to generate transformed second green color channel data;

for each respective red picture element of a plurality of red picture elements of the red color channel, modify an initial value corresponding to the respective red picture element using a calculated value derived from values of a second kernel, the second kernel comprising a plurality of green picture elements of one or more of the first green color channel and the second green color channel that are selected based on a position of the respective red picture element, to generate transformed red color channel data;

for each respective blue picture element of a plurality of blue picture elements of the blue color channel, modify an initial value corresponding to the respective blue picture element using a calculated value derived from values of a third kernel, the third kernel comprising a plurality of green picture elements of one or more of the first green color channel and the second green color channel that are selected based on a position of the respective blue picture element, to generate transformed blue color channel data;

compress the transformed second green color channel data, data corresponding to the first green color channel, the transformed red color channel data, and the transformed blue color channel data, to generate compressed mosaiced color motion video image data; and store the compressed mosaiced color motion video image data in the memory device.

2. The portable electronic device of claim 1, wherein the one or more hardware processors are configured to, for each respective green picture element of the plurality of green picture elements of the second green color channel, perform the modification of the initial value corresponding to the respective green picture element by subtracting the calculated value from the initial value.

3. The portable electronic device of claim 2, wherein, for each respective green picture element of the plurality of green picture elements of the second green color channel, the calculated value comprises an average of the values of the plurality of green picture elements in the first kernel.

4. The portable electronic device of claim 3, wherein the plurality of green picture elements in the first kernel comprise at least two green picture elements which are on opposite sides of the respective green picture element.

5. The portable electronic device of claim 3, wherein the plurality of green picture elements in the first kernel include green picture elements from two picture element rows or from four picture element rows.

6. The portable electronic device of claim 1 further comprising:
   a lens mount; and
   a removable lens attachable to the lens mount,
   wherein the mosaiced color motion video image data is mosaiced according to a Bayer pattern.

7. The portable electronic device of claim 1, wherein the one or more hardware processors are further configured to:
   for each respective green picture element of the plurality of green picture elements of the second green color channel, determine whether the first kernel comprising the plurality of green picture elements of the first green color channel comprises any virtual green picture elements positioned beyond an edge of the one or more image sensors, and if so, to assign a value to each of the virtual green picture elements for use in deriving the calculated value.

8. The portable electronic device of claim 7, wherein the value assigned to each of the virtual green picture elements is a copy of the value of a non-virtual green picture element in the first kernel.

9. The portable electronic device of claim 1, wherein the plurality of green picture elements of the first kernel comprising the plurality of green picture elements of the first green color channel include at least four green picture elements of the first green color channel that form a square centered on the respective green picture element of the plurality of green picture elements of the second green color channel.

10. The portable electronic device of claim 9, wherein the first kernel comprising the plurality of green picture elements of the first green color channel has four green picture elements.

11. The portable electronic device of claim 9, wherein the first kernel comprising the plurality of green picture elements of the first green color channel comprises at least 16 green picture elements.

12. The portable electronic device of claim 1, wherein for each respective green picture element of the plurality of green picture elements of the second green color channel, the first kernel comprising the plurality of green picture elements of the first green color channel is centered on the respective green picture element.

13. The portable electronic device of claim 1, wherein:
   the generation of the transformed second green color channel data results in a spatial decorrelation of the data corresponding to the first green color channel from the transformed second green color channel data,
   the generation of the transformed red color channel data results in a spatial decorrelation of data corresponding to the first green color channel from the transformed red color channel data, and
   the generation of the transformed blue color channel data results in a spatial decorrelation of the data corresponding to the first green color channel from the blue color channel data.

14. The portable electronic device of claim 1, wherein the compression comprises application of a lossy compression algorithm, and wherein the one or more hardware processors are further configured to, for the plurality of image frames, apply a non-linear pre-emphasis function to the mosaiced color motion video image data prior to the compression.

15. The portable electronic device of claim 14, wherein the one or more hardware processors are configured to apply the pre-emphasis function to at least the transformed red color channel data, the transformed blue color channel data, and the transformed second green color channel data.

16. A portable electronic device capable of capturing digital motion video, the portable electronic device comprising:
   one or more image sensors; and
   one or more hardware processors configured to, for a plurality of motion video image frames:
   receive mosaiced color motion video image data acquired by the one or more image sensors, the mosaiced color motion video image data comprising a plurality of picture element values for each of a plurality of color channels, the color channels comprising at least a first green color channel, a second green color channel, a red color channel, and a blue color channel;
   for each respective green picture element of a plurality of green picture elements of the second green color channel, modify an initial value corresponding to the respective green picture element using a calculated value derived from values of a first kernel, the first kernel comprising a plurality of green picture elements of the first green color channel that are selected based on a position of the respective green picture element, to generate transformed second green color channel data;
   for each respective red picture element of a plurality of red picture elements of the red color channel, modify an initial value corresponding to the respective red picture element using a calculated value derived from values of a second kernel, the second kernel comprising a plurality of green picture elements of one or more of the first green color channel and the second green color channel that are selected based on a position of the respective red picture element, to generate transformed red color channel data;

for each respective blue picture element of a plurality of blue picture elements of the blue color channel, modify an initial value corresponding to the respective blue picture element using a calculated value derived from values of a third kernel, the third kernel comprising a plurality of green picture elements of one or more of the first green color channel and the second green color channel that are selected based on a position of the respective blue picture element, to generate transformed blue color channel data; and compress the transformed second green color channel data, data corresponding to the first green color channel, the transformed red color channel data, and the transformed blue color channel data, to generate compressed mosaiced color motion video image data.

17. The portable electronic device of claim 16, wherein the one or more hardware processors are further configured to, for each respective green picture element of the plurality of green picture elements of the second green color channel, subtract the calculated value from the initial value corresponding to the respective green picture element, and wherein, for each respective green picture element of the plurality of green picture elements of the second green color channel, the calculated value comprises an average of the values of the plurality of green picture elements in the first kernel, and the plurality of green picture elements in the first kernel comprise at least four picture elements which are on opposite sides of the respective green picture element.

18. The portable electronic device of claim 17 further comprising:
a lens mount; and
a removable lens attachable to the lens mount.

19. The portable electronic device of claim 16, wherein the compression comprises application of a lossy compression algorithm, and wherein the one or more hardware processors are further configured to, for the plurality of image frames, apply a non-linear pre-emphasis function to the mosaiced color motion video image data prior to the compression.

20. The portable electronic device of claim 19, wherein the one or more hardware processors are configured to apply the pre-emphasis function to at least the transformed red color channel data, the transformed blue color channel data, and the transformed second green color channel data.

21. A system configured to decode color motion video image data, the system comprising:
one or more image sensors; and
one or more hardware processors configured to:
access encoded color image data, wherein:
the encoded color image data was generated from mosaiced color motion video image data initially acquired by the one or more image sensors,
the encoded color image data includes at least a first green color channel, a second green color channel, a red color channel, and a blue color channel, and
the encoded color image data was encoded at least partly by, for a plurality of motion video image frames:
for each respective green picture element of a plurality of green picture elements of the second green color channel, modifying an initial value corresponding to the respective green picture element using a calculated value derived from values of a first kernel, the first kernel comprising a plurality of green picture elements of the first green color channel of the plurality of color channels that are selected based on a position of the respective green picture element, to generate transformed second green color channel data, for each respective red picture element of a plurality of red picture elements of the red color channel, modifying an initial value corresponding to the respective red picture element using a calculated value derived from values of a second kernel, the second kernel comprising a plurality of green picture elements of one or more of the first green color channel and the second green color channel that are selected based on a position of the respective red picture element, to generate transformed red color channel data, for each respective blue picture element of a plurality of blue picture elements of the blue color channel, modifying an initial value corresponding to the respective blue picture element using a calculated value derived from values of a third kernel, the third kernel comprising a plurality of green picture elements of one or more of the first green color channel and the second green color channel that are selected based on a position of the respective blue picture element, to generate transformed blue color channel data, and compressing the transformed second green color channel data, data corresponding to the first green color channel, the transformed red color channel data, and the transformed blue color channel data, to generate compressed mosaiced color motion video image data; and decode the accessed encoded color motion video image data to reproduce the red color channel that has been transformed, the blue color channel that has been transformed, data corresponding to the first green color channel, and the second green color channel that has been transformed.

22. The system of claim 21 wherein the system comprises a portable electronic device having imaging capability, and the system further comprises:
a lens mount; and
a removable lens attachable to the lens mount.

* * * * *